United States Patent
Xu et al.

(10) Patent No.: US 10,887,288 B2
(45) Date of Patent: Jan. 5, 2021

(54) METHOD FOR ENCRYPTING VOICE IN VOICE COMMUNICATIONS, CALLING TERMINAL AND CALLED TERMINAL, AND SYSTEM

(71) Applicant: YULONG COMPUTER TELECOMMUNICATION SCIENTIFIC (SHENZHEN) CO., LTD., Shenzhen (CN)

(72) Inventors: Xing-Shao Xu, Shenzhen (CN); De-Ying Guo, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 178 days.

(21) Appl. No.: 16/090,248

(22) PCT Filed: Nov. 30, 2016

(86) PCT No.: PCT/CN2016/107811
§ 371 (c)(1),
(2) Date: Sep. 29, 2018

(87) PCT Pub. No.: WO2017/166840
PCT Pub. Date: Oct. 5, 2017

(65) Prior Publication Data
US 2019/0116162 A1    Apr. 18, 2019

(30) Foreign Application Priority Data
Mar. 31, 2016 (CN) .......................... 2016 1 0201062

(51) Int. Cl.
*H04L 29/06* (2006.01)
*H04L 9/08* (2006.01)
(Continued)

(52) U.S. Cl.
CPC ........... *H04L 63/0428* (2013.01); *H04K 1/00* (2013.01); *H04L 9/0861* (2013.01); *H04W 8/18* (2013.01);
(Continued)

(58) Field of Classification Search
CPC . H04L 63/0428; H04L 9/0861; H04L 9/0816; H04L 9/0866; H04L 9/0869;
(Continued)

(56) References Cited

U.S. PATENT DOCUMENTS 5,991,407 A * 11/1999 Murto .................. H04L 9/3271
380/248
6,097,817 A * 8/2000 Bilgic ................. H04L 63/0428
380/270
(Continued)

FOREIGN PATENT DOCUMENTS

| CN | 101997676 A | 3/2011 |
| CN | 103795533 A | 5/2014 |
| CN | 104737570 A | 6/2015 |

*Primary Examiner* — Cheng-Feng Huang
(74) *Attorney, Agent, or Firm* — ScienBiziP, P.C.

(57) ABSTRACT

An embodiment of the disclosure provides a voice communication method, a calling terminal, a called terminal and a system, the voice communication method includes: establishing, by a calling terminal, a data communication connection between a called terminal and the calling terminal; obtaining a calling terminal international mobile subscriber identity (IMSI), a called terminal IMSI, a first random number for encryption and decryption, and generating a first encryption key; encrypting voice signals according to the first encryption key by using a preset encryption algorithm and obtaining first encrypted voice signals; sending the first encrypted voice signals to the called terminal. The first encryption key is generated according to the calling terminal IMSI, the called terminal IMSI, and the voice signals are encrypted by using the preset encryption algorithm, thus an (Continued)

encryption process is highly targeted and highly confidential, and security of voice services is improved.

6 Claims, 8 Drawing Sheets

(51) Int. Cl.
   *H04K 1/00* (2006.01)
   *H04W 12/00* (2009.01)
   *H04W 12/04* (2009.01)
   *H04W 8/18* (2009.01)
   *H04W 12/02* (2009.01)

(52) U.S. Cl.
   CPC ....... *H04W 12/0013* (2019.01); *H04W 12/02* (2013.01); *H04W 12/0401* (2019.01)

(58) Field of Classification Search
   CPC . H04L 65/1016; H04K 1/00; H04W 12/0013; H04W 12/0401; H04W 8/18; H04W 12/02
   See application file for complete search history.

(56) References Cited

U.S. PATENT DOCUMENTS

| | | | | |
|---|---|---|---|---|
| 6,510,515 | B1* | 1/2003 | Raith | H04W 4/06 713/163 |
| 6,876,747 | B1* | 4/2005 | Faccin | H04L 63/06 380/247 |
| 2002/0176581 | A1* | 11/2002 | Bilgic | H04L 63/08 380/270 |
| 2005/0063544 | A1* | 3/2005 | Uusitalo | H04L 63/306 380/277 |
| 2005/0078824 | A1* | 4/2005 | Malinen | G06F 21/44 380/247 |
| 2005/0108534 | A1* | 5/2005 | Bajikar | H04L 63/0853 713/172 |
| 2007/0189516 | A1* | 8/2007 | Lee | H04L 9/3006 380/30 |
| 2010/0161979 | A1* | 6/2010 | Bertin | H04L 29/06027 713/168 |
| 2011/0150211 | A1* | 6/2011 | Anderson | H04W 12/0013 380/1 |
| 2015/0365822 | A1* | 12/2015 | Sharma | H04W 12/04031 455/410 |
| 2016/0192194 | A1* | 6/2016 | Yang | H04W 12/0802 713/171 |

* cited by examiner

FIG. 5-a

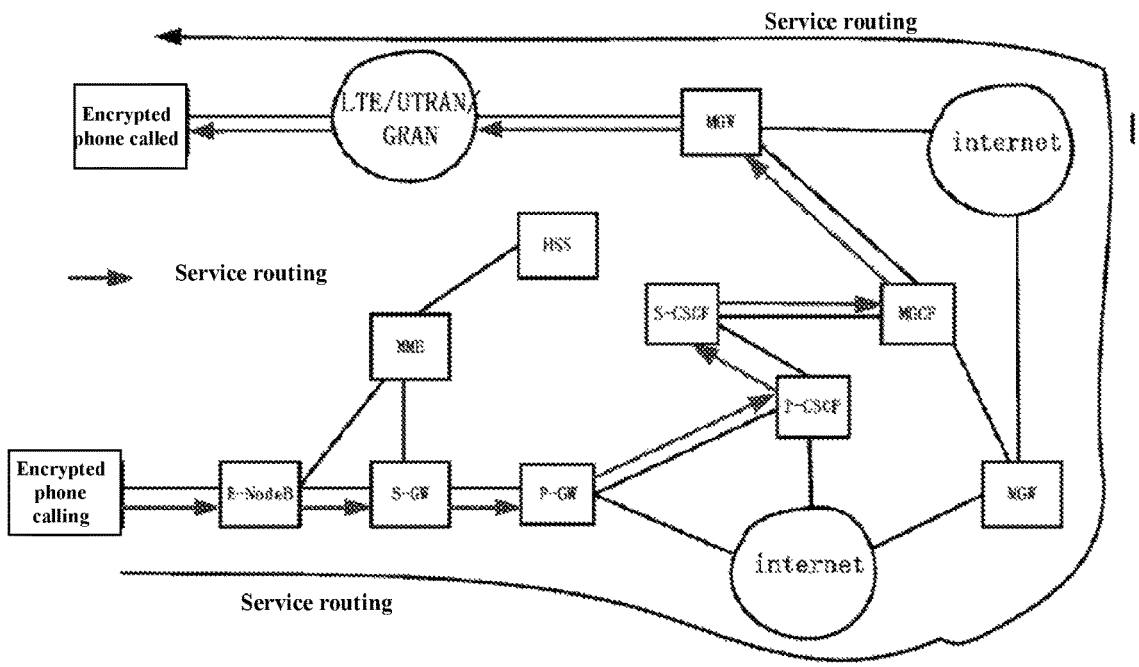
FIG. 5-b
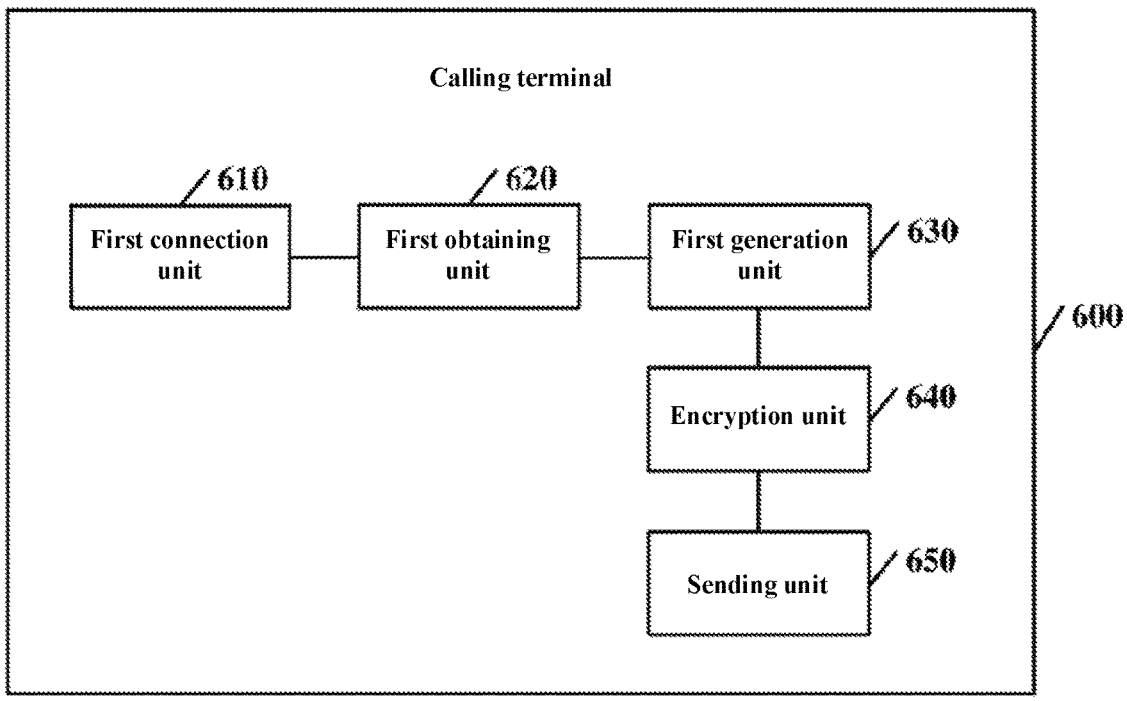
FIG. 6

METHOD FOR ENCRYPTING VOICE IN VOICE COMMUNICATIONS, CALLING TERMINAL AND CALLED TERMINAL, AND SYSTEM

CROSS-REFERENCE TO RELATED APPLICATIONS

This application claims priority of Chinese Patent Application No. 201610201062.8, entitled "METHOD FOR ENCRYPTING VOICE IN VOICE COMMUNICATIONS, CALLING TERMINAL AND CALLED TERMINAL, AND SYSTEM" filed on Mar. 31, 2016 in the China National Intellectual Property Administration (CNIPA), the entire contents of which are incorporated by reference herein.

FIELD

The present disclosure relates to a technical field of communication, specifically a method for encrypting voice in voice communications, a calling terminal and a called terminal, and a system.

BACKGROUND

An IP (Internet Protocol) multimedia subsystem (IMS) is a new business form of multimedia, the IMS can meet the needs of current terminal clients for newer, more diverse multimedia services. A Voice over Long-Term Evolution (VoLTE) builds voice services on operators' networks, thus, operators can provide control and management with a higher level for the VoLTE.

With the use of VoLTE terminals and low cost of VoLTE voice services, voice services based on IMS systems will be more and more widely used. However, confidentiality while voice signals are being transmitted through IP lines is not protected, low security of IMS-based voice services is the result.

SUMMARY

One embodiment of the present disclosure provides a method for encrypting voice in voice communications, calling terminal and called terminal, and system, which encrypts voice signals in a process of voice communication, and improves security of voice services based on IMS system.

A first aspect of the embodiment of the present disclosure provides a voice communication method, which includes:

Establishing, by a calling terminal, a data communication connection between a called terminal and the calling terminal;

Obtaining a calling terminal international mobile subscriber identity (IMSI), a called terminal IMSI, and a first random number for encryption and decryption, and sending the first random number for encryption and decryption to the called terminal;

Generating a first encryption key by using a preset key generation algorithm according to the calling terminal IMSI, the called terminal IMSI, and the first random number for encryption and decryption;

Encrypting voice signals according to the first encryption key by using a preset encryption algorithm and obtaining first encrypted voice signals;

Sending the first encrypted voice signals to the called terminal.

A second aspect of the embodiment of the present disclosure provides a voice communication method, which includes:

Establishing, by a called terminal, a data communication connection between a calling terminal and the called terminal;

Obtaining a calling terminal IMSI, a called terminal IMSI, and receiving a first random number for encryption and decryption sent by the calling terminal;

Receiving first encrypted voice signals sent by the calling terminal;

Generating a first decryption key by using a preset key generation algorithm according to the calling terminal IMSI, the called terminal IMSI, and the first random number for encryption and decryption; Decrypting the first encrypted voice signals by using a preset encryption algorithm according to the first decryption key.

A third aspect of the embodiment of the present disclosure provides a calling terminal, which includes:

A first connection unit configured to establish a data communication connection between a called terminal and the calling terminal for the calling terminal;

A first obtaining unit configured to obtain a calling terminal international mobile subscriber identity (IMSI), a called terminal IMSI, and a first random number for encryption and decryption, and send the first random number for encryption and decryption to the called terminal;

A first generating unit configured to generate a first encryption key by using a preset key generation algorithm according to the calling terminal IMSI, the called terminal IMSI, and the first random number for encryption and decryption;

An encryption unit configured to encrypt voice signals according to the first encryption key by using a preset encryption algorithm and obtaining first encrypted voice signals;

A sending unit configured to send the first encrypted voice signals to the called terminal.

A fourth aspect of the embodiment of the present disclosure provides a calling terminal, which includes:

A second connection unit configured to establish a data communication connection between a calling terminal and the called terminal for the called terminal;

A second obtaining unit configured to obtain a calling terminal IMSI, a called terminal IMSI, and receive a first random number for encryption and decryption sent by the calling terminal;

A receiving unit configured to receive first encrypted voices signal sent by the calling terminal;

A second generating unit configured to generate a first decryption key by using a preset key generation algorithm according to the calling terminal IMSI, the called terminal IMSI, and the first random number for encryption and decryption;

A decryption unit configured to decrypt the first encrypted voice signals by using a preset encryption algorithm according to the first decryption key.

A fifth aspect of the embodiment of the present disclosure provides a voice communication system, which includes:

A calling terminal and a called terminal;

The calling terminal can be the calling terminal provided in the third aspect of the embodiment of the present disclosure, the called terminal can be the called terminal provided in the fourth aspect of the embodiment of the present disclosure.

In one embodiment of the present disclosure, a calling terminal establishes a data communication connection between a called terminal and the calling terminal. The calling then terminal obtains a calling terminal IMSI, a called terminal IMSI, and a first random number for encryption and decryption, and sends the first random number for encryption and decryption to the called terminal, after the calling terminal generates a first encryption key using a preset key generation algorithm according to the calling terminal IMSI, the called terminal IMSI, and the first random number for encryption and decryption. The called terminal encrypts voice signals by using a preset encryption algorithm according to the first encryption key, and obtaining first encrypted voice signals, and finally sends the first encrypted voice signals to the called terminal. The first encryption key is generated according to the calling terminal IMSI, the called terminal IMSI, and the first random number for encryption and decryption, and the voice signals are encrypted by using the preset encryption algorithm, thus an encryption process is highly targeted and highly confidential, and security of voice services is improved.

Moreover, since the IMS network-based voice communication uses an IP network for communication, communication cost can be saved.

BRIEF DESCRIPTION OF THE DRAWINGS

In order to more clearly illustrate the embodiments of the present disclosure or the technical solutions in the prior art, the drawings used in the embodiments or the prior art description will be briefly introduced below. Obviously, the drawings in the following description are only some embodiments of the present disclosure, and those skilled in the art can obtain other drawings from these drawings without any creative work.

FIG. 5-*b* shows a flowchart of a voice communication network according to the present disclosure;

FIG. 6 shows a schematic structural diagram of a first embodiment of a calling terminal according to the present disclosure;

DETAILED DESCRIPTION

Figure 1:
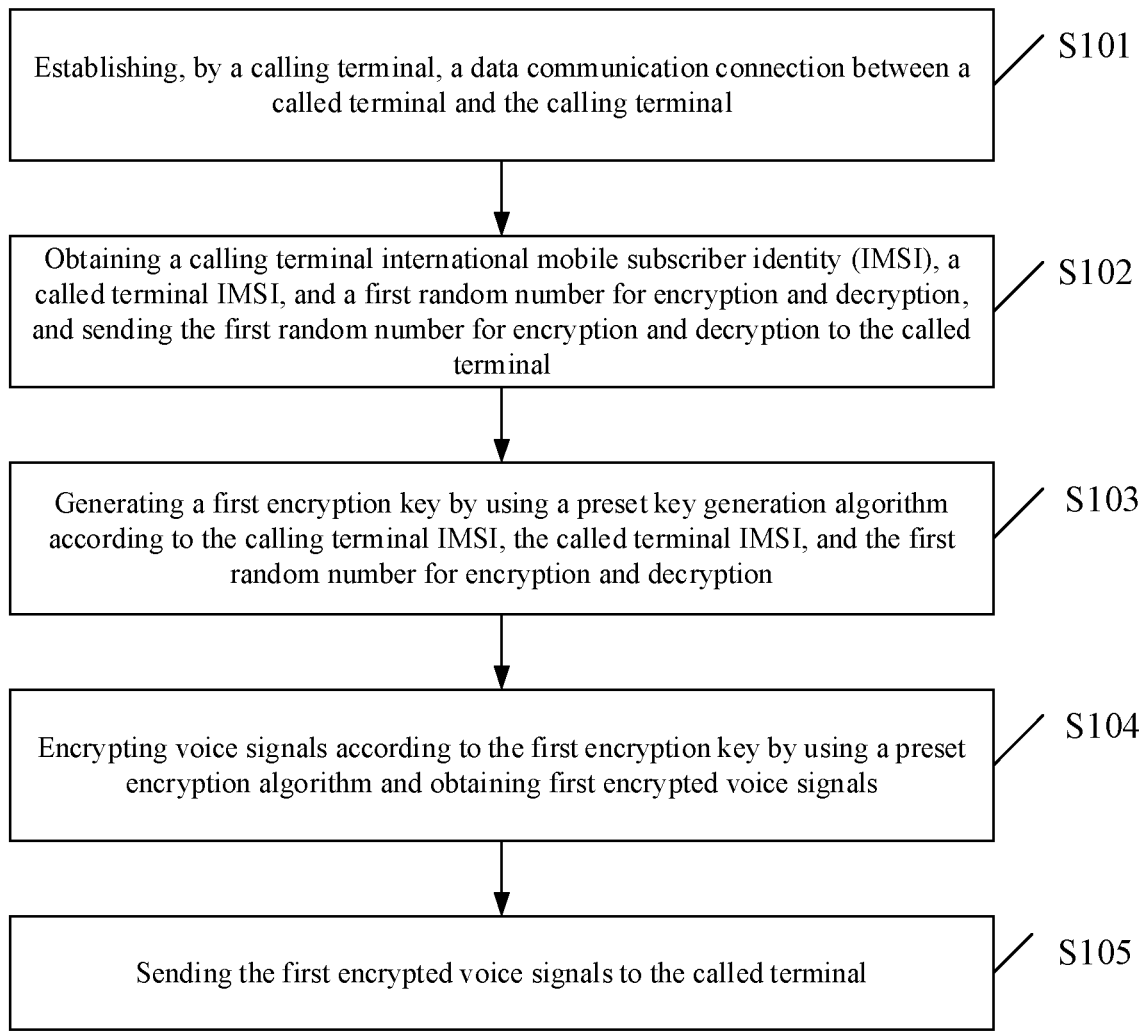
FIG. 1 shows a schematic flow chart of a first embodiment of a voice communication method according to the present disclosure.

Embodiments of the present disclosure provides a method for encrypting voice in voice communications, calling terminal and called terminal, and system, which encrypts voice signals in a process of voice communication, and improves security of voice services based on IMS system.

In order to enable those skilled in the art to better understand the solution of the present disclosure, the technical solutions in the embodiments of the present disclosure will be described below with reference to drawings in the embodiments of the present disclosure. Obviously, described embodiments are merely embodiments which are a part of the present disclosure, rather than every embodiment. All other embodiments obtained by those of ordinary skill in the art based on the embodiments of the present disclosure without creative efforts should be within the scope of the present disclosure.

Terms such as "first", "second", and "third" in the specification and claims of the present disclosure and the above drawings are used to distinguish different objects, and are not intended to describe a specific order. Moreover, terms "include" and any variations of the "include" are intended to indicate a non-exclusive inclusion. For example, a process, a method, a system, a product, or a device which includes a series of steps or units is not limited to listed steps or units, but optionally, also includes steps or units not listed, or optionally, also includes other steps or units inherent to these processes, methods, products, or equipment.

Some of terms used in the present application are clarified below.

(1) A calling terminal or called terminal, also called user equipment (UE), indicates a communication terminal able to communicate with each other. For example, portable equipment with an infinite connection function, vehicle equipment, and so on. Common terminals include, for example, mobile phones, tablets, laptops, PDAs, mobile Internet devices, wearable devices, such as smart watches, smart bracelets, pedometers, and so on.

(2) A matrix displacement encryption algorithm indicates arranging letters in plain text to be in a matrix according to a given sequence, and letters are selected from the matrix according to another sequence (namely encryption keys) for generating a ciphertext. Generally a sequence is transcribed by a column, such as an original sequence 1 2 3 4 5 6 can becomes 5 2 6 4 1 3. When a plaintext Network Security is arranged in an M*N (assumed to be 3*6) matrix in rows, as shown below:

1 2 3 4 5 6
N e t w o r
k   S e c u
r i t y

A substitution is applied: according to an given order, the sequence is rearranged by 5, 2, 6, 4, 1, 3, and the following is obtained:

5 2 6 4 1 3
o e r w N t
c u e k S
i y r t

So the ciphertext is oerwNtc uekS i yrt; and the encryption key is 526413.

The decryption process is just the opposite. After the ciphertext is arranged in order, the data is read by column replacement and then by row.

(3) "Multiple" represents two or more. "And/or", describes association relationships of associated objects, which indicates there are three relationships. For example, A and/or B may indicate that A exists independently, that both A and B exist, and that B may exist independently. The character "/" generally means an "or" relationship between contextual objects.

A voice communication method provided by one embodiment of the present disclosure, includes: establishing, by a calling terminal, a data communication connection between a called terminal and the calling terminal; obtaining a calling terminal international mobile subscriber identity (IMSI), a called terminal IMSI, and a first random number for encryption and decryption, and sending the first random number for encryption and decryption to the called terminal; generating a first encryption key by using a preset key generation algorithm according to the calling terminal IMSI, the called terminal IMSI, and the first random number for encryption and decryption; encrypting voice signals according to the first encryption key by using a preset encryption algorithm and obtaining first encrypted voice signals; sending the first encrypted voice signals to the called terminal.

FIG. 1 shows a schematic flow chart of a first embodiment of a voice communication method according to the present disclosure. As shown in FIG. 1, the first embodiment of the voice communication method provided by the present disclosure may include the following steps:

S101, establishing, by a calling terminal, a data communication connection between a called terminal and the calling terminal.

The calling terminal refers to user equipment that actively initiates a voice call during a voice communication process, and the called terminal refers to user equipment that performs a voice communication with the calling terminal while receiving a voice call from the calling terminal during the voice communication process.

In one embodiment of the present disclosure, a data communication connection is established between the calling terminal and the called terminal based on the IMS network.

Specifically, a signaling connection is first established between the calling terminal and the called terminal to realize signaling communication between the calling terminal and the called terminal, and then a service communication connection is established between the calling terminal and the called terminal.

S102, obtaining a calling terminal international mobile subscriber identity (IMSI), a called terminal IMSI, and a first random number for encryption and decryption, and sending the first random number for encryption and decryption to the called terminal.

An IMSI is a symbol that distinguishes mobile subscribers. It is stored in a subscriber identification module (SIM) card and can be used for distinguishing valid information of the mobile subscribers.

Specifically, after establishing the signaling connection between the calling terminal and the called terminal, a calling terminal subscriber identification module identity (SIMI) number and a called terminal SIMI number are obtained during the signaling communication.

The first random number for encryption and decryption refers to a random number generated by a random number generation unit in a calling terminal encryption module at a first moment, and the random number generation unit generates different random numbers for encryption and decryption at different times.

Optionally, in one embodiment of the present disclosure, an encryption module may generate different random numbers RAND periodically, thus security of the user information can be improved. Specifically, the period can be 64 s, 128 s, etc.

In the embodiment of the present disclosure, the first random number for encryption and decryption can be sent to the called terminal through the data communication connection established between the calling terminal and the called terminal. Optionally, the first random number for encryption and decryption is sent through a signaling route between the calling terminal and the called terminal.

S103, generating a first encryption key by using a preset key generation algorithm according to the calling terminal IMSI, the called terminal IMSI, and the first random number for encryption and decryption.

The preset key generation algorithm refers to an encryption algorithm that is preset in the calling terminal encryption module for generating an encryption key. In the embodiment of the present disclosure, the preset key generation algorithm has three input parameters and one output parameter.

The encryption key can be the encryption key used when encrypting by using a preset encryption algorithm.

Specifically, in the embodiment of the present disclosure, the key generation algorithm takes the calling terminal IMSI, the called terminal IMSI, and the first random number for encryption and decryption as the input parameters, and outputs the first encryption key.

Optionally, in one embodiment of the present disclosure, the preset key generation algorithm can be an algorithm for encrypting global mobile communication system cellular communication. Specifically, the preset key generation algorithm can be A3 and A8 algorithms, thus the calling terminal take the calling terminal IMSI, the called terminal IMSI, and the first random number for encryption and decryption as the input parameters, and the called terminal uses the input parameters and two different algorithms A3 and A8 to calculate and obtains the first encryption key.

S104, encrypting voice signals according to the first encryption key by using a preset encryption algorithm and obtaining first encrypted voice signals.

The preset encryption algorithm refers to an algorithm preset in the terminal for encrypting voice signals, and the preset encryption algorithm can be the matrix displacement encryption algorithm mentioned in descriptions of some words at the beginning of the embodiments of the present disclosure or a simple displacement encryption algorithm in the prior art.

Optionally, the preset encryption algorithm is a matrix displacement encryption algorithm.

In one embodiment of the present disclosure, a complexity of the matrix displacement encryption algorithm depends on a matrix row and column M, N, and column transformation sequence, and values of the matrix row and column M, N, and column transformation sequence are determined by the key Kc that is generated by a complex algorithm, and the values of the matrix row and column M, N, and column transformation sequence can be changed randomly. The key Kc corresponds to a combination of the matrix row and column M, N, and column transformation sequence. Different random numbers RAND can generate different keys Kc that corresponds to different matrix rows and columns M, N, and column transformation sequences.

Specifically, the voice signals need to be converted into a pulse code modulation digital code stream including characters 0 and 1 by an analog-to-digital conversion. Thus the voice signals can be encrypted by using the matrix displacement encryption algorithm.

Specifically, a correspondence table of keys Kc and the matrix rows and columns M, N, and column transformation sequences is stored in the calling terminal, thus the voice signals, which is converted into the PCM digital code stream, can be matrix transform encrypted by using keys Kc according to the correspondence table of keys Kc. The matrix rows and columns M, N, and column transformation sequences.

Specifically, since the encryption key Kc is changed periodically, the matrix displacement encryption algorithm used is also periodically changed according to Kc.

S105, sending the first encrypted voice signals to the called terminal.

Specifically, the calling terminal first encodes, interleaves, and modulates the encrypted PCM digital stream voice signals, and then sends encoded voice signals to the called terminal.

In one embodiment of the present disclosure, the calling terminal establishes a data communication connection between a called terminal and the calling terminal, then the calling terminal obtains a calling terminal IMSI, a called terminal IMSI, and a first random number for encryption and decryption, and sends the first random number for encryption and decryption to the called terminal, after the calling terminal generates a first encryption key using a preset key generation algorithm according to the calling terminal IMSI, the called terminal IMSI, and the first random number for encryption and decryption, and the called terminal encrypts voice signals by using a preset encryption algorithm according to the first encryption key, and obtaining first encrypted voice signals, and finally sends the first encrypted voice signals to the called terminal. The first encryption key is generated according to the calling terminal IMSI, the called terminal IMSI, and the first random number for encryption and decryption, and the voice signals are encrypted by using the preset encryption algorithm, thus an encryption process is highly targeted and highly confidential, and security of voice services is improved.

Moreover, since the IMS network-based voice communication uses an IP network for communication, communication cost can be saved.

Optionally, in one embodiment of the present disclosure, the method further includes:

Obtaining, by the calling terminal, a second random number for encryption and decryption after a preset time interval in a process of performing data communication with the called terminal;

Generating a second decryption key by using a preset key generation algorithm according to the calling terminal IMSI, the called terminal IMSI, and the second random number for encryption and decryption;

Encrypting voice signals according to the second encryption key by using a preset encryption algorithm and obtaining second encrypted voice signals;

Sending the second encrypted voice signals to the called terminal.

The second random number for encryption and decryption also refers to a random number generated by the random number generation unit in the calling terminal encryption module at a second moment, and the random number is different from the first random number generated by the random number generation unit at the first moment.

Different random numbers for encryption and decryption is generated at different times and then different encryption keys are generated, then a preset encryption algorithm is used for encryption. Therefore, since the encryption key is changed continuously during encryption processes of the voice communication, the matrix displacement mode is changed, encryption security is improved.

In order to better understanding and implementation the above solutions of the embodiment of the present disclosure, the following will be combined with some specific application scenarios for illustration.

Figure 2:
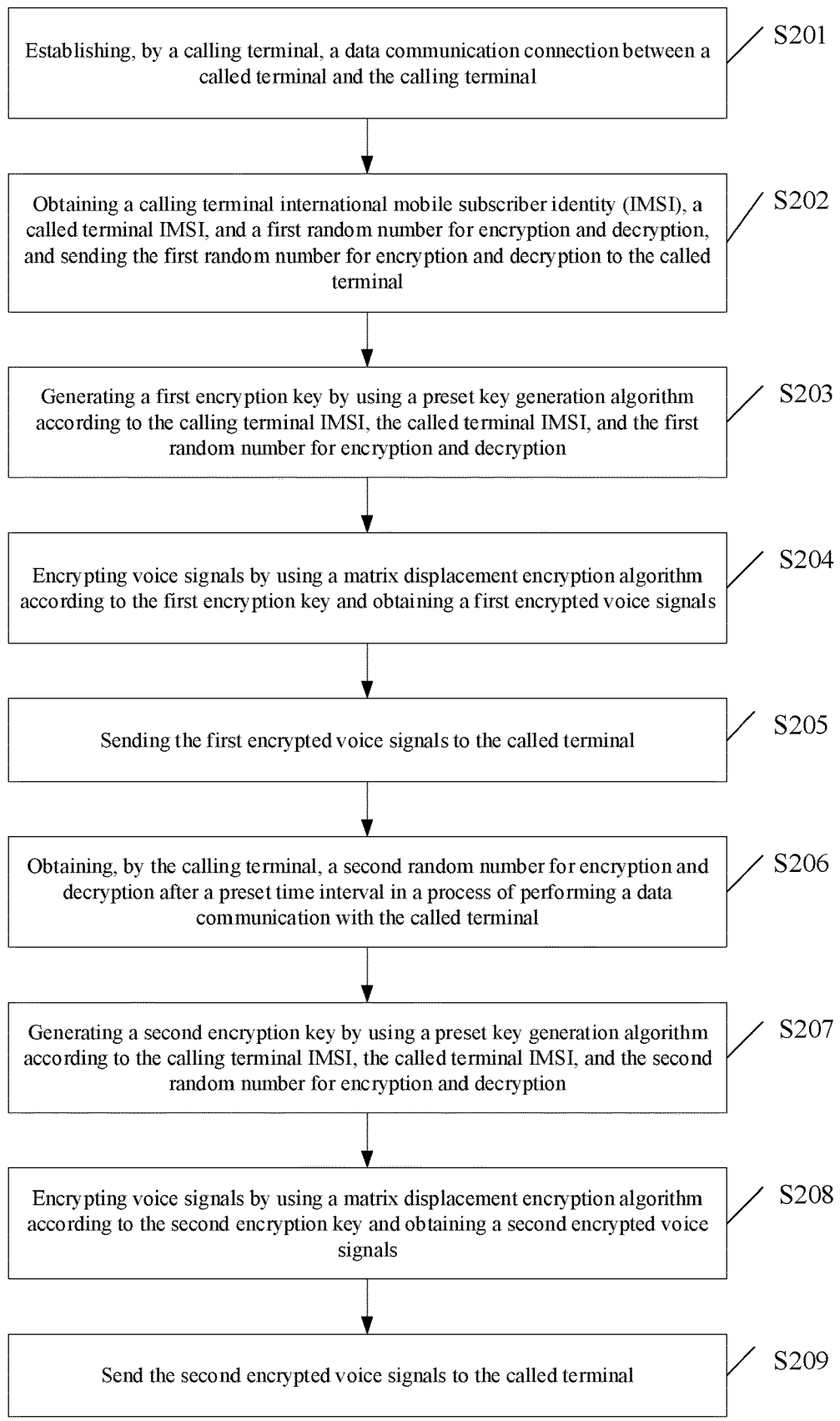
FIG. 2 shows a schematic flow chart of a second embodiment of a voice communication method according to the present disclosure.

FIG. 2 shows a schematic flow chart of a second embodiment of a voice communication method according to the present disclosure. As shown in FIG. 2, the second embodiment of the voice communication method provided by the embodiment of the present disclosure can include the following steps:

S201, establishing, by a calling terminal, a data communication connection between a called terminal and the calling terminal.

In one embodiment of the present disclosure, the calling terminal inputs a called terminal IMSI number into an encryption module of the calling terminal, thus a one-to-one encrypted channel is established between a called terminal and the calling terminal.

In one embodiment of the present disclosure, first, the calling terminal establishes a signaling route between the called terminal and the called terminal, thus a signaling communication between the calling terminal and the called terminal is realized, and second, a subsequent voice service communication is prepared.

S202, obtaining a calling terminal international mobile subscriber identity (IMSI), a called terminal IMSI, and a first random number for encryption and decryption, and sending the first random number for encryption and decryption to the called terminal.

S203, generating a first encryption key by using a preset key generation algorithm according to the calling terminal IMSI, the called terminal IMSI, and the first random number for encryption and decryption.

S204, encrypting voice signals by using a matrix displacement encryption algorithm according to the first encryption key and obtaining a first encrypted voice signals.

S205, sending the first encrypted voice signals to the called terminal.

S206, obtaining, by the calling terminal, a second random number for encryption and decryption after a preset time interval in a process of performing a data communication with the called terminal.

Optionally, the second random number for encryption and decryption is different from the first random number for encryption and decryption.

S207, generating a second encryption key by using a preset key generation algorithm according to the calling terminal IMSI, the called terminal IMSI, and the second random number for encryption and decryption.

Optionally, the second encryption key is different from the first encryption key.

S208, encrypting voice signals by using a matrix displacement encryption algorithm according to the second encryption key and obtaining second encrypted voice signals.

Specifically, since the first encryption key and the second encryption key are different, a way of a matrix displacement used in a process of specifically encrypting the voice signal is also different.

S209, sending the second encrypted voice signals to the called terminal.

Specifically, the calling terminal first encodes, interleaves, and modulates the second encrypted voice signals, and then sends encoded voice signals to the called terminal through antennas and a IMS network.

It should be noted that the same steps in the embodiment of the present disclosure as in the first embodiment will not be described here again.

In one embodiment, the calling terminal establishes a data communication connection between a called terminal and the calling terminal, then the calling terminal obtains a calling terminal IMSI, a called terminal IMSI, and a first random number for encryption and decryption, and sends the first random number for encryption and decryption to the called terminal, after the calling terminal generates a first encryption key using a preset key generation algorithm according to the calling terminal IMSI, the called terminal IMSI, and the first random number for encryption and decryption, and the called terminal encrypts voice signals by using a preset encryption algorithm according to the first encryption key, and obtaining first encrypted voice signals, and finally sends the first encrypted voice signals to the called terminal. The first encryption key is generated according to the calling terminal IMSI, the called terminal IMSI, and the first random number for encryption and decryption. The voice signals are encrypted by using the preset encryption algorithm, thus an encryption process is highly targeted and highly confidential, and security of voice services is improved.

Moreover, since the IMS network-based voice communication uses an IP network for communication, communication cost can be saved.

The embodiment of the present disclosure further provides a voice communication method, which includes: establishing, by a called terminal, a data communication connection between a calling terminal and the called terminal; receiving first encrypted voice signals sent by the calling terminal; obtaining a calling terminal IMSI, a called terminal IMSI, and receiving a first random number for encryption and decryption sent by the calling terminal; generating a first decryption key by using a preset key generation algorithm according to the calling terminal IMSI, the called terminal IMSI, and the first random number for encryption and decryption; decrypting the first encrypted voice signals by using a preset encryption algorithm according to the first decryption key.

Figure 3:
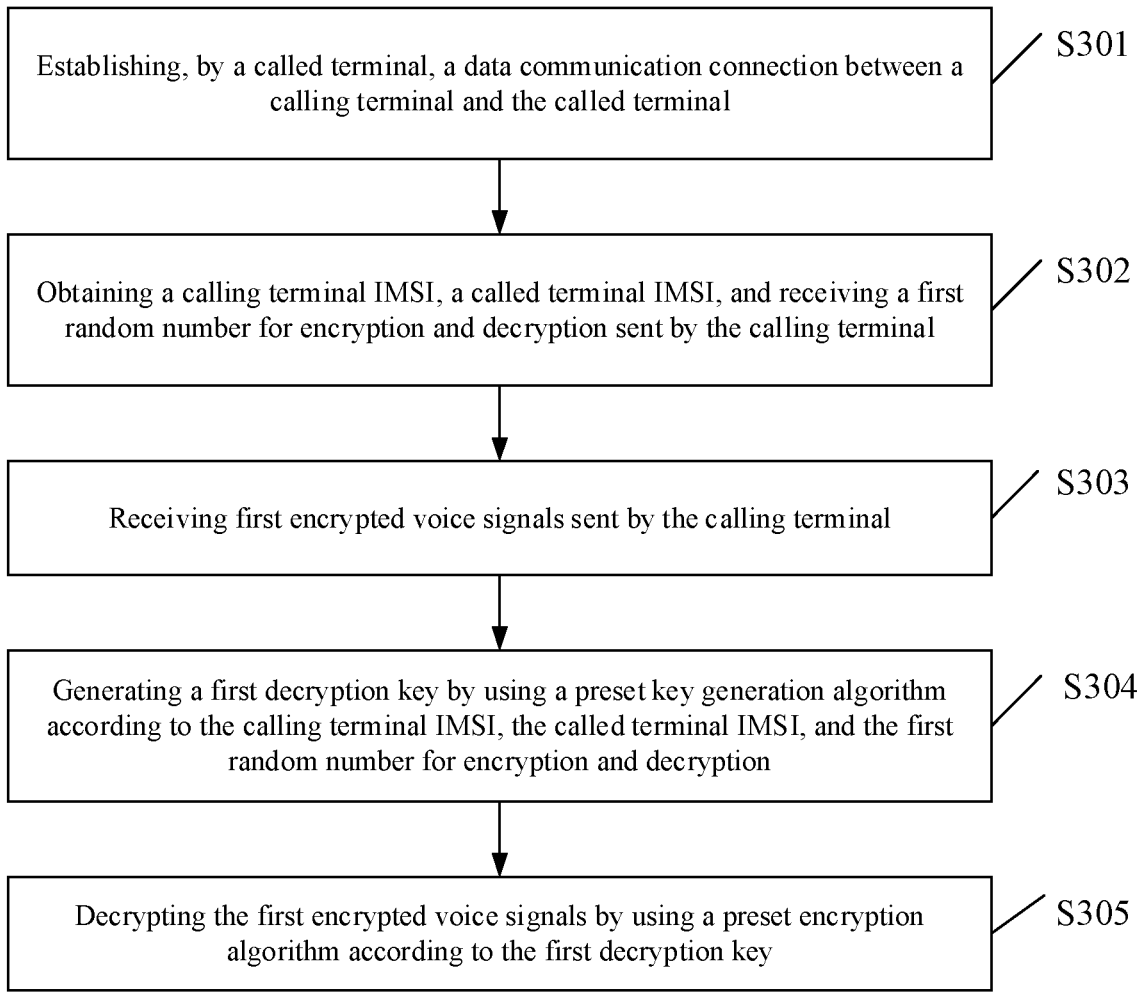
FIG. 3 shows a schematic flow chart of a third embodiment of a voice communication method according to the present disclosure.

FIG. 3 shows a schematic flow chart of a third embodiment of a voice communication method according to an embodiment of the present disclosure. As shown in FIG. 3, the third embodiment of the voice communication method provided by the embodiment of the present disclosure can include the following steps:

S301, establishing, by a called terminal, a data communication connection between a calling terminal and the called terminal.

In the embodiment of the present disclosure, the data communication connection is established between the calling terminal and the called terminal based on the IMS network.

Specifically, firstly a signaling connection is established between the calling terminal and the called terminal and a signaling communication between the calling terminal and the called terminal is realized, and secondly a service communication connection is established between the calling terminal and the called terminal.

S302, obtaining a calling terminal IMSI, a called terminal IMSI, and receiving a first random number for encryption and decryption sent by the calling terminal.

An IMSI is a symbol that distinguishes mobile subscribers. It is stored in a subscriber identification module (SIM) card and can be used for distinguishing valid information of the mobile subscribers. Thus the called terminal IMSI can be used to identify an identity of the called terminal user, and the calling terminal IMSI can be used to identify an identity of the calling terminal user.

The first random number for encryption and decryption refers to an random number for encryption and decryption sent by the calling terminal received by the called terminal at the first moment.

In one embodiment of the present disclosure, the called terminal can receive the first random number for encryption and decryption sent by the calling terminal through the data communication connection between the calling terminal and the called terminal. Optionally, the first random number for encryption and decryption is received through a signaling route between the calling terminal and the called terminal.

In one embodiment of the present disclosure, since the calling terminal establishes a signaling connection with the called terminal and a signaling communication is realized, the called terminal can extract a IMSI number of the calling terminal from receiving signaling which is sent by the calling terminal.

S303, receiving first encrypted voice signals sent by the calling terminal.

In one embodiment of the present disclosure, the called terminal receives the first encrypted voice signals through the service route between the calling terminal and the called terminal, specifically, the called terminal receives the first encrypted voice signals through a media gateway (MGW).

Moreover, after receiving the first encrypted voice signals sent by the calling terminal, the called terminal needs to de-interleave, decode, and demodulate the first encrypted voice signals, and generate the first decoded voice signals and then decrypted.

S304, generating a first decryption key by using a preset key generation algorithm according to the calling terminal IMSI, the called terminal IMSI, and the first random number for encryption and decryption.

The preset key generation algorithm refers to an encryption algorithm that is pre-set in the calling terminal encryption module for generating an encryption key. In the embodiment of the present disclosure, the preset key generation algorithm has three input parameters and one output parameter.

The decryption key refers to a decryption key that is used during encrypting by using a preset encryption algorithm, and the decryption key is a key corresponding to an encryption key that is used during encrypting by using a preset encryption algorithm, that is, when the decryption key is decrypted using the preset encryption algorithm, the voice signals before encryption can be restored.

Specifically, in the embodiment of the present disclosure, the preset key generation algorithm takes the calling terminal IMSI, the called terminal IMSI, and the first random number for encryption and decryption as the input parameters, and outputs the first decryption key.

Optionally, in one embodiment of the present disclosure, the preset key generation algorithm can be an algorithm for encrypting global mobile communication system cellular communication. Specifically, the preset key generation algorithm can be A3 and A8 algorithms, thus the calling terminal take the calling terminal IMSI, the called terminal IMSI, and the first random number for encryption and decryption as the input parameters, and the called terminal uses the input parameters and two different algorithms A3 and A8 to calculate and obtains the first encryption key.

S305, decrypting the first encrypted voice signals by using a preset encryption algorithm according to the first decryption key.

The preset encryption algorithm refers to an algorithm preset in the terminal for encrypting voice signals, and the preset encryption algorithm can be the matrix displacement encryption algorithm mentioned in descriptions of some words at the beginning of the embodiments of the present disclosure or a simple displacement encryption algorithm in the prior art.

Optionally, the preset encryption algorithm is a matrix displacement encryption algorithm.

Specifically, a correspondence table of keys Kc and the matrix rows and columns M, N, and column sequences is stored in the calling terminal, thus according to the correspondence table of keys Kc and the matrix rows and columns M, N, and column sequence, initially decoded voice signals are decrypted by the matrix displacement encryption algorithm by using the key Kc to obtain the same voice signals as in the calling terminal.

Specifically, since the encryption key Kc is changed periodically, the matrix displacement encryption algorithm used is also periodically changed according to Kc.

In the embodiment of the present disclosure, the decryption process is the reverse process of the process of encrypting by using the preset encryption algorithm in the calling terminal. That is, after decrypting the first encrypted voice signals finally, the voice signals before encryption in the calling terminal is obtained.

The order of step S302 and S303 is not limited in this implementation. That is, the order that the called terminal receives the first encrypted voice signals and the first random number for encryption and decryption has no strict sequence. The first voice encrypted signals received corresponds to the first encrypted and decrypted random number, and the first random number for encryption and decryption is used to decrypt the first encrypted voice signals.

In one embodiment of the present disclosure, the called terminal establishes a data communication connection between the calling terminal and the called terminal, and obtains a calling terminal IMSI, a called terminal IMSI, and receives a first random number for encryption and decryption, first encrypted voice signals sent by the calling terminal. The called terminal generates a first decryption key by using a preset key generation algorithm according to the calling terminal IMSI, the called terminal IMSI, and the first random number for encryption and decryption, and finally the called terminal decrypts the first encrypted voice signals by using a preset encryption algorithm according to the first decryption key. The first decryption key is generated according to the calling terminal IMSI, the called terminal IMSI, and the first random number for encryption and decryption, and the voice signals are decrypted by using the preset encryption algorithm, thus an encryption process is highly targeted and highly confidential, and security of voice services is improved.

Moreover, since the IMS network-based voice communication uses an IP network for communication, communication cost can be saved.

Optionally, in one embodiment of the present disclosure, the method further includes:

Receiving, by the called terminal, second encrypted voice signals and a second random number for encryption and decryption sent by the calling terminal in a process of performing data communication with the calling terminal;

Generating a second decryption key by using a preset key generation algorithm according to the calling terminal IMSI, the called terminal IMSI, and the second random number for encryption and decryption;

Decrypting the second encrypted voice signals by using a preset encryption algorithm according to the second decryption key.

The second random number for encryption and decryption refers to an random number for encryption and decryption received by the called terminal from the calling terminal at a second moment. The second random number for encryption and decryption is different from the first random number for encryption and decryption, and the second random number for encryption and decryption corresponds to the second encrypted and decrypted voice signal received by the called terminal. Thus after receiving new second random number for encryption and decryption sent by the calling terminal at the second moment, the called terminal regenerates the second decryption key by using the second random number for encryption and decryption, and then decrypts the second encrypted voice signals by using a preset encryption algorithm.

Different random numbers for encryption and decryption from the calling terminal is received at different times, and different decryption keys is generated by using the currently received random numbers for encryption and decryption. A matrix displacement algorithm is used to decrypt the currently received corresponding voice signals. Since the decryption key is changed continuously during decryption processes of the voice communication, the matrix displacement mode is also continuously changed, therefore improving encryption security.

In order to better understanding and implementation the above solutions of the embodiment of the present disclosure, The following will be combined with some specific application scenarios for illustration.

Figure 4:
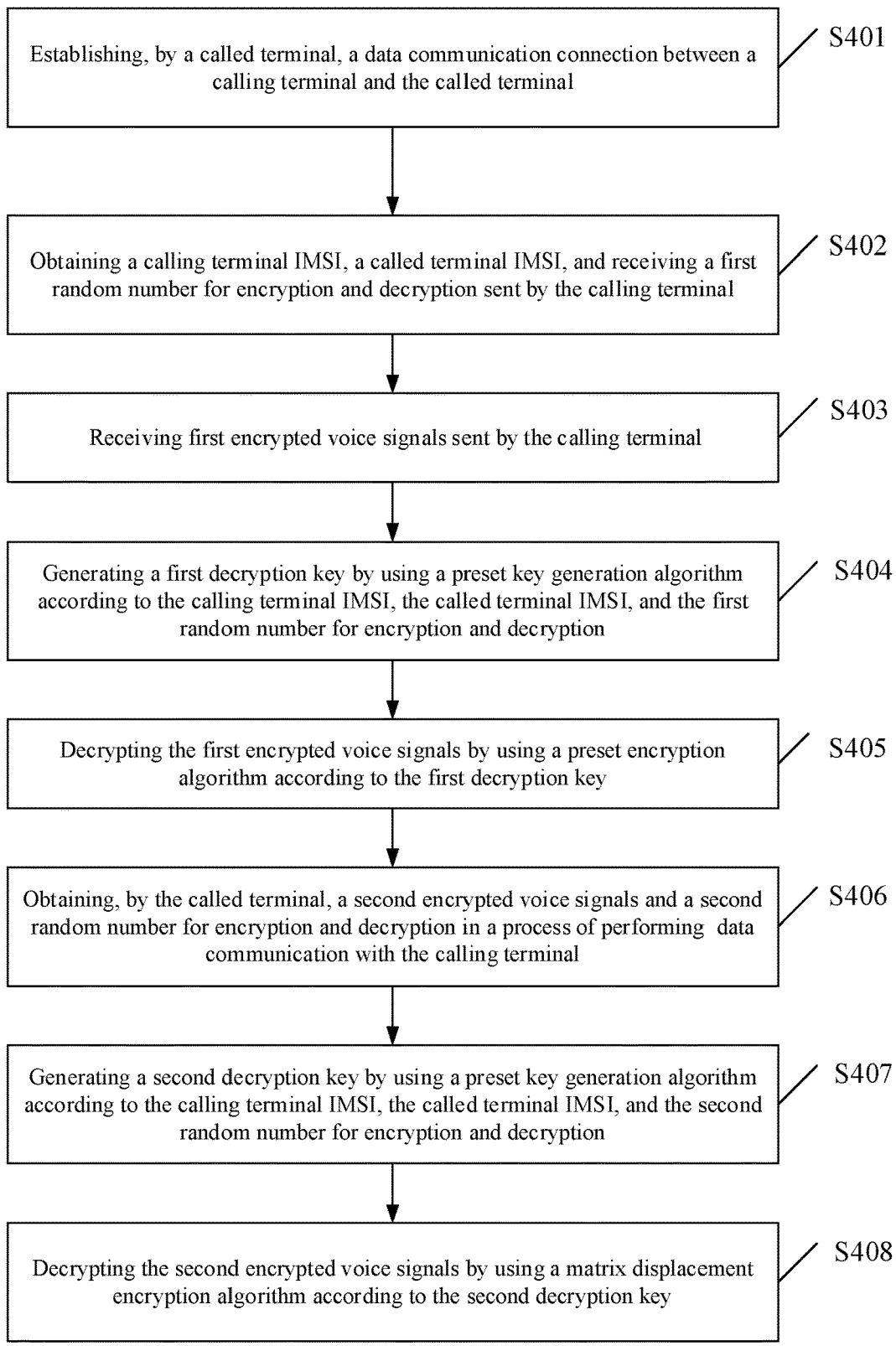
FIG. 4 shows a schematic flow chart of a fourth embodiment of a voice communication method according to the present disclosure.

FIG. 4 shows a schematic flow chart of a fourth embodiment of a voice communication method according to an embodiment of the present disclosure. As shown in FIG. 4, the fourth embodiment of the voice communication method provided by the embodiment of the present disclosure may include the following steps:

S401, establishing, by a called terminal, a data communication connection between a calling terminal and the called terminal.

In the embodiment of the present disclosure, the data communication connection is established between the calling terminal and the called terminal based on a IMS network.

Specifically, firstly the calling terminal establishes a signaling route between the called terminal and the called terminal and realizing a signaling communication between the calling terminal and the called terminal, and secondly a service communication connection is established between the calling terminal and the called terminal.

S402, obtaining a calling terminal IMSI, a called terminal IMSI, and receiving a first random number for encryption and decryption sent by the calling terminal.

S403, receiving first encrypted voice signals sent by the calling terminal.

S404, generating a first decryption key by using a preset key generation algorithm according to the calling terminal IMSI, the called terminal IMSI, and the first random number for encryption and decryption.

In one embodiment of the present disclosure, steps S403 and S404 are not strictly sequential, but the first encrypted voice signals received in the step S403 corresponds to the first encrypted and decrypted random number received in the step S404. The first random number for encryption and decryption is used to decrypt the first encrypted voice signals.

S405, decrypting the first encrypted voice signals by using a preset encryption algorithm according to the first decryption key.

S406, obtaining, by the called terminal, a second encrypted voice signals and a second random number for encryption and decryption in a process of performing data communication with the calling terminal.

The second encrypted voice signals are different from the first encrypted voice signals, and the second encrypted and decrypted random number is different from the first encrypted and decrypted random number.

In one embodiment of the present disclosure, the second random number for encryption and decryption corresponds to the second encrypted voice signals, that is, the second random number for encryption and decryption is used for decrypting the second encrypted voice signals.

Generally, the encrypted random number received at a certain time matches the encrypted voice signals at that moment. That is, the encrypted and decryption random number is used for decrypt the second encrypted voice signals.

S407, generating a second decryption key by using a preset key generation algorithm according to the calling terminal IMSI, the called terminal IMSI, and the second random number for encryption and decryption.

In the fourth embodiment of the disclosure, the second decryption key is different from the first decryption key.

S408, decrypting the second encrypted voice signals by using a matrix displacement encryption algorithm according to the second decryption key.

It should be noted that the same steps in the embodiment of the present disclosure as in the second embodiment will not be described here again.

In one embodiment, the called terminal establishes a data communication connection between the calling terminal and the called terminal, and obtains a calling terminal IMSI, a called terminal IMSI, and receives a first random number for encryption and decryption and first encrypted voice signals sent by the calling terminal. Then the called terminal generates a first decryption key by using a preset key generation algorithm according to the calling terminal IMSI, the called terminal IMSI, and the first random number for encryption and decryption, and finally decrypts the first encrypted voice signals by using a preset encryption algorithm according to the first decryption key. The first decryption key is generated according to the calling terminal IMSI, the called terminal IMSI, and the first random number for encryption and decryption, and the voice signals are decrypted by using the preset encryption algorithm, thus a decryption process is highly targeted and highly confidential, and security of voice services is improved.

Moreover, since the IMS network-based voice communication uses an IP network for communication, communication cost can be saved.

Figure 5:
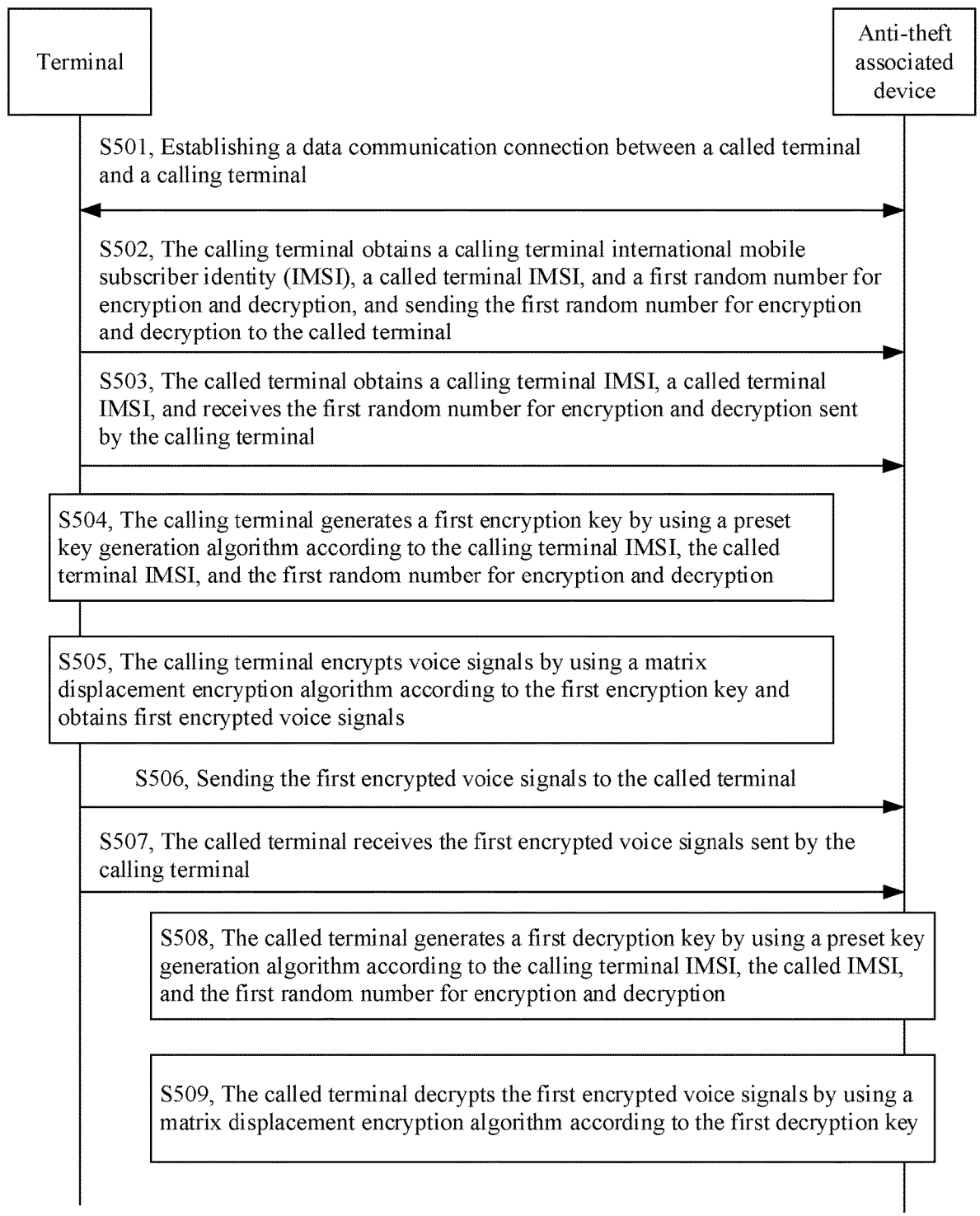
FIG. 5-*a* shows a schematic flow chart of a fifth embodiment of a voice communication method according to the present disclosure.

The following is an interactive embodiment. FIG. 5-*a*, which shows a schematic flow chart of a fifth embodiment of a voice communication method according to an embodiment of the present disclosure. As shown in FIG. 5-*a*, the fifth embodiment of the voice communication method provided by the embodiment of the present disclosure may include the following steps:

S501, establishing a data communication connection between a called terminal and a calling terminal.

Specifically, FIG. 5-*b* shows a flowchart of a voice communication network according to an embodiment of the present disclosure, establishing, by a calling terminal, a data communication connection between a called terminal and the calling terminal including the following steps:

(1) The calling terminal inputs a IMSI number of the called terminal into an encryption module to establish a one-to-one encryption channel with the called terminal;

(2) After an IMS system is successful registered, the calling terminal initiates a Volte service request to the called terminal, and the calling terminal establishes a point-to-point protocol (PPP) connection with the called terminal in the IMS system according to the session initiation protocol (SIP signaling);

(3) The called terminal inputs an IMSI number of the calling terminal into the encryption module to establish a one-to-one encryption channel with the calling terminal;

(4) A Serving GateWay (SGW) negotiates with the calling terminal about an IP address assigned by the PDN GateWay (PGW) to the calling terminal;

(5) The calling terminal sends the session request to a proxy-call session control function (P-SCSF) of the IMS system through a LTE network, and obtains an IP address of the called terminal;

(6) A service-call session control function (S-CSCF) processes the session request, and sends a session request 200 ACK instruction to the called terminal through the IMS network;

(7) The called terminal receives the 200 ACK instruction sent by the calling terminal and returns a 200 OK instruction to the calling terminal;

(8) After the calling terminal receives the SIP signaling of 200 OK handshake successfully from the called terminal, the called terminal and the calling terminal establish the data communication connection successfully.

In one embodiment of the present disclosure, the called terminal and the calling terminal establish the signaling connection firstly, and then establish the data communication connection.

S502, the calling terminal obtains a calling terminal international mobile subscriber identity (IMSI), a called terminal IMSI, and a first random number for encryption and decryption, and sending the first random number for encryption and decryption to the called terminal.

In one embodiment of the present disclosure, the calling terminal performs an analog-to-digital conversion on voice signals and converts the voice signals into a PCM digital code stream including characters 0 and 1.

S503, the called terminal obtains a calling terminal IMSI, a called terminal IMSI, and receives the first random number for encryption and decryption sent by the calling terminal.

S504, the calling terminal generates a first encryption key by using a preset key generation algorithm according to the calling terminal IMSI, the called terminal IMSI, and the first random number for encryption and decryption.

Specifically, in one embodiment of the present disclosure, the calling terminal generates a key Kc according to the IMSI number of the calling terminal, the IMSI number of the called terminal and the first random number for encryption and decryption, which corresponds to a matrix row and column M, N, and column transformation sequence, and then uses a matrix displacement method encryption on a voice digital code stream according to the matrix row and column M, N, and column transformation sequence.

S505, the calling terminal encrypts voice signals by using a matrix displacement encryption algorithm according to the first encryption key and obtains first encrypted voice signals.

S506, the first encrypted voice signals are sent to the called terminal.

Specifically, in one embodiment of the present disclosure, after the calling terminal encrypts the voice and obtains the first encrypted voice signals, the first encrypted voice signal is packaged in a SIP/UDP/IP packet, and compressed, and then the encrypted code stream is encoded; after the code stream is interleaved and encoded, it is sent through an antenna of the calling terminal; finally after the signal is received by the base station, it enters the mobile network, Internet, MWG and then sent to the called terminal.

Optionally, in one embodiment of the present disclosure, the encryption module generates different random numbers RAND for encryption and decryption periodically, thus the calling terminal changes matrix displacement mode to encrypt the voice signals.

S507, the called terminal receives the first encrypted voice signals sent by the calling terminal.

Specifically, after receiving the first encrypted voice signals sent by the calling terminal, the called terminal performs a preliminary decoding by using an interleaved code modulator.

S508, the called terminal generates a first decryption key by using a preset key generation algorithm according to the calling terminal IMSI, the called IMSI, and the first random number for encryption and decryption.

S509, the called terminal decrypts the first encrypted voice signals by using a matrix displacement encryption algorithm according to the first decryption key.

Specifically, the calling terminal generates a key Kc according to the IMSI number of the calling terminal, the IMSI number of the called terminal and an random number for encryption and decryption, which corresponds to a matrix row and column M, N, and column transformation sequence, and then encrypts a voice digital code stream using a matrix displacement method.

Moreover, after decrypting the signal, the called terminal deconstructs the SIP/UDP/IP packet and restores it into a PCM digital signal stream; and then restores to a voice stream by an analog-to-digital (A/D) conversion. The voice stream is consistent with a voice stream before encrypting by the calling terminal.

Moreover, during a call process, after the calling terminal or the called terminal hangs up, the voice communication is removed and the call ends.

In one embodiment of the present disclosure, the calling terminal establishes the data communication connection between the called terminal and the calling terminal, and the calling terminal obtains the calling terminal IMSI, the called terminal IMSI and the first encrypted random number, and sends the first encrypted random number to the called terminal. Then the calling terminal uses the terminal calling IMSI, the called terminal IMSI and the first encrypted random number to generate the first encryption key by using the preset key generation algorithm, and encrypts the voice information by the first encryption key according to a preset encryption algorithm to obtain the first encrypted voice signals, and finally sends the first encrypted voice signals to the called terminal. The called terminal establishes a data communication connection between the calling terminal the called terminal and obtains the calling terminal IMSI and the called terminal IMSI, and the called terminal receives the first random number for encryption and decryption and the first encrypted voice signals sent by the calling terminal, and then the called terminal is generate the first decryption key by using the preset key generation algorithm according to the calling terminal IMSI, the called terminal IMSI, and the first random number for encryption and decryption, and finally decrypts the first encrypted voice signals by using the first decryption key according to a preset encryption algorithm. The first encryption key is generated according to the calling terminal IMSI, the called terminal IMSI, and the first random number for encryption and decryption, and the voice signals are encrypted by using the preset encryption algorithm, thus an encryption process is highly targeted and highly confidential, and security of voice services is improved.

Moreover, since the IMS network-based voice communication uses an IP network for communication, communication cost can be saved.

One embodiment of the present disclosure further provides a calling terminal, and the calling terminal includes:

A first connection unit configured to establish a data communication connection between a called terminal and the calling terminal for the calling terminal;

A first obtaining unit configured to obtain a calling terminal international mobile subscriber identity (IMSI), a called terminal IMSI, and a first random number for encryption and decryption, and send the first random number for encryption and decryption to the called terminal;

A first generating unit configured to generate a first encryption key by using a preset key generation algorithm according to the calling terminal IMSI, the called terminal IMSI, and the first random number for encryption and decryption;

An encryption unit configured to encrypt voice signals according to the first encryption key by using a preset encryption algorithm and obtaining first encrypted voice signals;

A sending unit configured to send the first encrypted voice signals to the called terminal.

FIG. 6 shows a schematic structural diagram of a first embodiment of a calling terminal according to an embodiment of the present disclosure. As shown in FIG. 6, the calling terminal 600 can include:

A first connection unit 610, a first obtaining unit 620, a first generating unit 630, an encryption unit 640, and t a sending unit 650.

The first connection unit 610 configured to establish a data communication connection between a called terminal and the calling terminal for the calling terminal.

The calling terminal refers to user equipment that actively initiates a voice call during a voice communication process, and the called terminal refers to user equipment that performs voice communication with the calling terminal while receiving a voice call from the calling terminal during the voice communication process.

In one embodiment of the present disclosure, a data communication connection is established between the calling terminal and the called terminal based on the IMS network.

Specifically, a signaling connection is first established between the calling terminal and the called terminal to realize signaling communication between the calling terminal and the called terminal, and then a service communication connection is established between the calling terminal and the called terminal.

The first obtaining unit 620 configured to obtain a calling terminal international mobile subscriber identity (IMSI), a called terminal IMSI, and a first random number for encryption and decryption, and send the first random number for encryption and decryption to the called terminal.

An IMSI is a symbol that distinguishes mobile subscribers. It is stored in a subscriber identification module (SIM) card and can be used for distinguishing valid information of the mobile subscribers.

Specifically, after establishing the signaling connection between the calling terminal and the called terminal, a calling terminal subscriber identification module identity (SIMI) number and a called terminal SIMI number are obtained during the signaling communication.

The first random number for encryption and decryption refers to a random number generated by a random number generation unit in a calling terminal encryption module at a first moment, and the random number generation unit generates different random numbers for encryption and decryption at different times.

Optionally, in one embodiment of the present disclosure, an encryption module may generate different random numbers RAND periodically, thus security of the user information can be improved. Specifically, the period can be 64 s, 128 s, etc.

In one embodiment of the present disclosure, the first random number for encryption and decryption can be sent to the called terminal through the data communication connection established between the calling terminal and the called terminal. Optionally, the first random number for encryption and decryption is sent through a signaling route between the calling terminal and the called terminal.

The first generating unit 630 configured to generate a first encryption key by using a preset key generation algorithm according to the calling terminal IMSI, the called terminal IMSI, and the first random number for encryption and decryption.

The preset key generation algorithm refers to an encryption algorithm that is pre-set in the calling terminal encryption module for generating an encryption key. In one embodiment of the present disclosure, the preset key generation algorithm has three input parameters and one output parameter.

The encryption key can be the encryption key used when encrypting by a preset encryption algorithm.

Specifically, In one embodiment of the present disclosure, the key generation algorithm takes the calling terminal IMSI, the called terminal IMSI, and the first random number for encryption and decryption as the input parameters, and outputs the first encryption key.

Optionally, in one embodiment of the present disclosure, the preset key generation algorithm can be an algorithm for encrypting global mobile communication system cellular communication. Specifically, the preset key generation algorithm can be A3 and A8 algorithms, thus the calling terminal take the calling terminal IMSI, the called terminal IMSI, and the first random number for encryption and decryption as the input parameters, and the called terminal uses the input parameters and two different algorithms A3 and A8 to calculate and obtains the first encryption key.

The encryption unit 640 configured to encrypt voice signals according to the first encryption key by using a preset encryption algorithm and obtaining first encrypted voice signals.

The preset encryption algorithm refers to an algorithm preset in the terminal for encrypting voice signals, and the preset encryption algorithm can be the matrix displacement encryption algorithm mentioned in descriptions of some words at the beginning of the embodiments of the present disclosure or a simple displacement encryption algorithm in the prior art.

Optionally, the preset encryption algorithm is a matrix displacement encryption algorithm.

In one embodiment of the present disclosure, a complexity of the matrix displacement encryption algorithm depends on a matrix row and column M, N, and column transformation sequence, and values of the matrix row and column M, N, and column transformation sequence are determined by the key Kc that is generated by a complex algorithm, and the values of the matrix row and column M, N, and column transformation sequence can be changed randomly. The key Kc corresponds to a combination of the matrix row and column M, N, and column transformation sequence, and different random numbers RAND can generate different keys Kc that corresponds to different matrix rows and columns M, N, and column transformation sequence.

Specifically, the voice signals needs to be converted into a pulse code modulation digital code stream including 0 and 1 by analog to digital conversion, thus the voice signals can be encrypted by using the matrix displacement encryption algorithm.

Specifically, a correspondence table of keys Kc and the matrix rows and columns M, N, and column transformation sequences is stored in the calling terminal, thus the voice signals, which is converted into the PCM digital code stream, can be matrix transform encrypted by using keys Kc according to the correspondence table of keys Kc and the matrix rows and columns M, N, and column transformation sequence.

Specifically, since the encryption key Kc is changed periodically, the matrix displacement encryption algorithm used is also periodically changed according to Kc.

The sending unit 650 configured to send the first encrypted voice signals to the called terminal.

Specifically, the calling terminal first encodes, interleaves, and modulates the encrypted PCM digital stream voice signals, and then sends encoded voice signals to the called terminal.

Moreover, since the IMS network-based voice communication uses an IP network for communication, communication cost can be saved.

Optionally, in one embodiment of the present disclosure, the first obtaining unit 620 further configured to obtaining a second random number for encryption and decryption after a preset time interval in a process of performing data communication with the called terminal for the calling terminal;

The first generating unit 630 further configured to generate a second decryption key by using a preset key generation algorithm according to the calling terminal IMSI, the called terminal IMSI, and the second random number for encryption and decryption;

The encryption module 640 further configured to encrypt voice signals according to the second encryption key by using a preset encryption algorithm and obtaining second encrypted voice signals;

The sending module 650 further configured to send the second encrypted voice signals to the called terminal.

The second random number for encryption and decryption also refers to a random number generated by the random number generation unit in the calling terminal encryption module at a second moment, and the random number is different from the first random number generated by the random number generation unit at the first moment.

Different random numbers for encryption and decryption is generated at different times and encryption keys is generated, then a preset encryption algorithm is used for encryption. Therefore, since the encryption key is changed continuously during encryption processes of the voice communication, the matrix displacement mode is changed, encryption security is improved.

The functions of the function modules of the calling terminal 600 in this embodiment may be specifically implemented according to the method in above method embodiments, and a specific implementation process may refer to related descriptions of above method embodiments and details are not described here again.

In one embodiment of the present disclosure, the calling terminal 600 establishes a data communication connection between a called terminal and the calling terminal 600, then the calling terminal 600 obtains a calling terminal IMSI, a called terminal IMSI, and a first random number for encryption and decryption, and sends the first random number for encryption and decryption to the called terminal. After the calling terminal 600 generates a first encryption key using a preset key generation algorithm according to the calling terminal IMSI, the called terminal IMSI, and the first random number for encryption and decryption, and the called terminal encrypts voice signals by using a preset encryption algorithm according to the first encryption key, and obtaining first encrypted voice signals, and finally sends the first encrypted voice signals to the called terminal. The first encryption key is generated according to the calling terminal IMSI, the called terminal IMSI, and the first random number for encryption and decryption, and the voice signals are encrypted by using the preset encryption algorithm, thus an encryption process is highly targeted and highly confidential, and security of voice services is improved.

Figure 7:
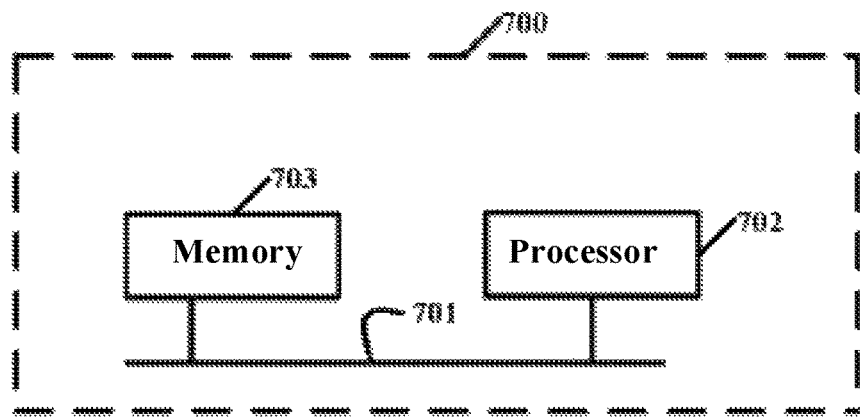
FIG. 7 shows a schematic structural diagram of a second embodiment of a calling terminal according to the present disclosure.

FIG. 7 shows a schematic structural diagram of a second embodiment of a calling terminal according to an embodiment of the present disclosure. As shown in FIG. 7, the communication terminal 700 may include: at least one bus 701, at least one processor 702 connected to the bus, and at least one memory 703 connected to the bus.

The processor 702 calls the code stored in the memory 703 through the bus 701 for establishing, by a calling terminal, a data communication connection between the called terminal and the calling terminal; obtaining a calling terminal IMSI, a called terminal IMSI, and a first random number for encryption and decryption, and sending the first random number for encryption and decryption to the called terminal; generating a first encryption key by using a preset key generation algorithm according to the calling terminal IMSI, the called terminal IMSI, and the first random number for encryption and decryption; encrypting voice signals according to the first encryption key by using a preset encryption algorithm and obtaining first encrypted voice signals; sending the first encrypted voice signals to the called terminal.

Optionally, in one embodiment of the present disclosure, the processor 702 further configured to:

Obtain a second random number for encryption and decryption after a preset time interval in a process of performing data communication with the called terminal for the calling terminal;

Generate a second decryption key by using a preset key generation algorithm according to the calling terminal IMSI, the called terminal IMSI, and the second random number for encryption and decryption;

Encrypt voice signals according to the second encryption key by using a preset encryption algorithm and obtaining second encrypted voice signals;

Send the second encrypted voice signals to the called terminal.

Optionally, in one embodiment of the present disclosure, the preset key generation algorithm can be an algorithm for encrypting global mobile communication system cellular communication.

The functions of the function units of the calling terminal 700 in this embodiment may be specifically implemented according to the method in above method embodiments, and a specific implementation process may refer to related descriptions of above method embodiments and details are not described here again.

In one embodiment of the present disclosure, the calling terminal 700 establishes a data communication connection between a called terminal and the calling terminal 700, then the calling terminal 700 obtains a calling terminal IMSI, a called terminal IMSI, and a first random number for encryption and decryption, and sends the first random number for encryption and decryption to the called terminal. After the calling terminal 700 generates a first encryption key using a preset key generation algorithm according to the calling terminal IMSI, the called terminal IMSI, and the first random number for encryption and decryption, and the called terminal encrypts voice signals by using a preset encryption algorithm according to the first encryption key, and obtaining first encrypted voice signals, and finally sends the first encrypted voice signals to the called terminal. The first encryption key is generated according to the calling terminal IMSI, the called terminal IMSI, and the first random number for encryption and decryption, and the voice signals are encrypted by using the preset encryption algorithm, thus an encryption process is highly targeted and highly confidential, and security of voice services is improved.

An embodiment of the present disclosure further provides a called terminal, and the called terminal includes:

A second connection unit configured to establish a data communication connection between a calling terminal and the called terminal for the called terminal;

A second obtaining unit configured to obtain a calling terminal IMSI, a called terminal IMSI, and receive a first random number for encryption and decryption sent by the calling terminal;

A receiving unit configured to receive first encrypted voices signal sent by the calling terminal;

A second generating unit configured to generate a first decryption key by using a preset key generation algorithm according to the calling terminal IMSI, the called terminal IMSI, and the first random number for encryption and decryption;

A decryption unit configured to decrypt the first encrypted voice signals by using a preset encryption algorithm according to the first decryption key.

Figure 8:
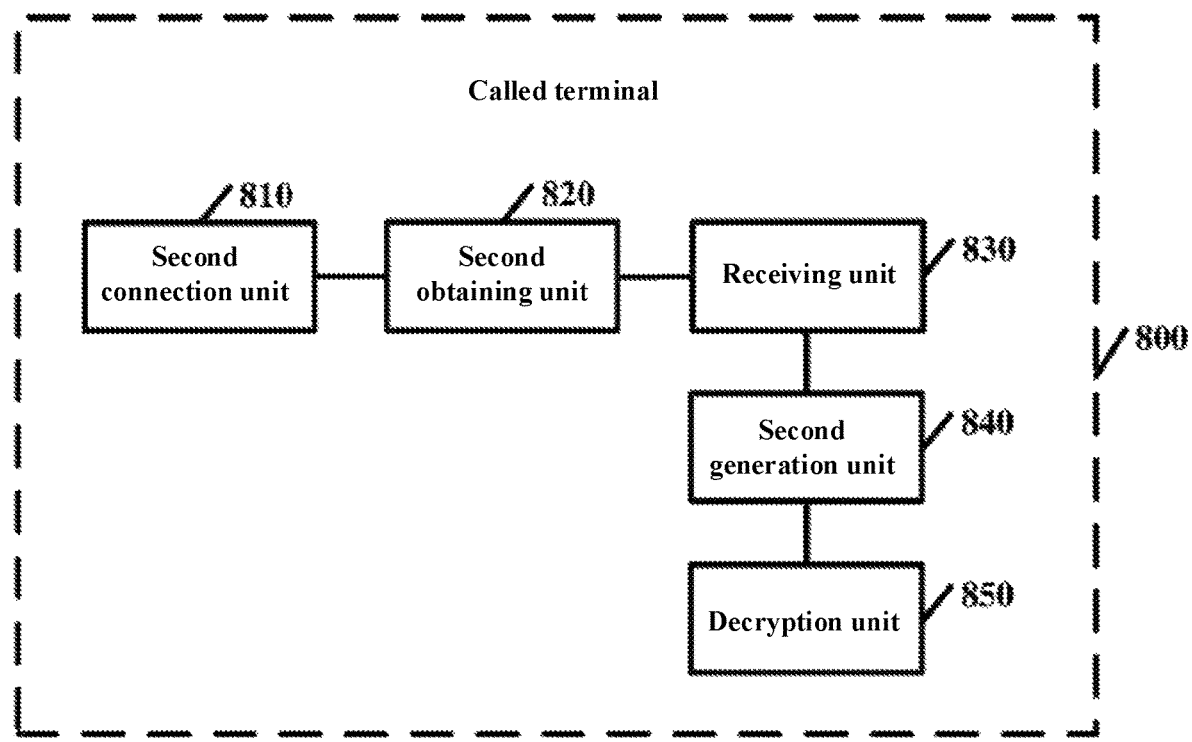
FIG. 8 shows a schematic structural diagram of a first embodiment of a called terminal according to the present disclosure.

FIG. 8 shows a schematic structural diagram of a first embodiment of a calling terminal according to an embodiment of the present disclosure. As shown in FIG. 8, the called terminal 800 can include:

The second connection unit 810, the second obtaining unit 820, the receiving unit 830, the second generation unit 840, and the decryption unit 850.

The second connection unit 810 configured to establish a data communication connection between a calling terminal and the called terminal for the called terminal.

In one embodiment of the present disclosure, the data communication connection is established between the calling terminal and the called terminal based on the IMS network.

Specifically, firstly a signaling connection is established between the calling terminal and the called terminal and a signaling communication between the calling terminal and the called terminal is realized, and then a service communication connection is established between the calling terminal and the called terminal.

The second obtaining unit 820 configured to obtain a calling terminal IMSI, a called terminal IMSI, and receive a first random number for encryption and decryption sent by the calling terminal.

An IMSI is a symbol that distinguishes mobile subscribers. It is stored in a subscriber identification module (SIM) card and can be used for distinguishing valid information of the mobile subscribers. Thus the called terminal IMSI can be used to identify an identity of the called terminal user, and the calling terminal IMSI can be used to identify an identity of the calling terminal user.

The first random number for encryption and decryption refers to an random number for encryption and decryption sent by the calling terminal received by the called terminal at the first moment.

In one embodiment of the present disclosure, the called terminal can receive the first random number for encryption and decryption sent by the calling terminal through the data communication connection between the calling terminal and the called terminal. Optionally, the first random number for encryption and decryption is received through a signaling route between the calling terminal and the called terminal.

In one embodiment of the present disclosure, since the calling terminal establishes a signaling connection with the called terminal and a signaling communication is realized, the called terminal can extract a IMSI number of the calling terminal by receiving signaling which is sent by the calling terminal.

The receiving unit 830 configured to receive first encrypted voices signal sent by the calling terminal.

In one embodiment of the present disclosure, the called terminal receives the first encrypted voice signals through the service route between the calling terminal and the called terminal, specifically, the called receives through a media gateway (MGW).

Moreover, after receiving the first encrypted voice signals sent by the calling terminal, the called terminal needs to de-interleave, decode, and demodulate the first encrypted voice signals, and generate the first decoded voice signals and then decrypted.

The second generating unit 840 configured to generate a first decryption key by using a preset key generation algorithm according to the calling terminal IMSI, the called terminal IMSI, and the first random number for encryption and decryption.

The preset key generation algorithm refers to an encryption algorithm that is pre-set in the calling terminal encryption module for generating an encryption key. In one embodiment of the present disclosure, the preset key generation algorithm has three input parameters and one output parameter.

The decryption key refers to a decryption key that is used during encrypting by using a preset encryption algorithm, and the decryption key is a key corresponding to an encryption key that is used during encrypting by using a preset encryption algorithm, that is, when the decryption key is decrypted using the preset encryption algorithm, the voice signals before encryption can be restored.

Specifically, In one embodiment of the present disclosure, the preset key generation algorithm takes the calling terminal IMSI, the called terminal IMSI, and the first random number for encryption and decryption as the input parameters, and outputs the first decryption key.

Optionally, in one embodiment of the present disclosure, the preset key generation algorithm can be an algorithm for encrypting global mobile communication system cellular communication. Specifically, the preset key generation algorithm can be A3 and A8 algorithms, thus the calling terminal take the calling terminal IMSI, the called terminal IMSI, and the first random number for encryption and decryption as the input parameters, and the called terminal uses the input parameters and two different algorithms A3 and A8 to calculate and obtains the first encryption key.

The decryption module 850 configured to decrypt the first encrypted voice signals by using a preset encryption algorithm according to the first decryption key.

The preset encryption algorithm refers to an algorithm preset in the terminal for encrypting voice signals, and the preset encryption algorithm can be the matrix displacement encryption algorithm mentioned in descriptions of some words at the beginning of the embodiments of the present disclosure or a simple displacement encryption algorithm in the prior art.

Optionally, the preset encryption algorithm is a matrix displacement encryption algorithm.

Specifically, a correspondence table of keys Kc and the matrix rows and columns M, N, and column transformation sequences is stored in the calling terminal, thus according to the correspondence table of keys Kc and the matrix rows and columns M, N, and column transformation sequence, initially decoded voice signals are decrypted by the matrix displacement encryption algorithm by using the key Kc to obtain the same voice signals as in the calling terminal.

Specifically, since the encryption key Kc is changed periodically, the matrix displacement encryption algorithm used is also periodically changed according to Kc.

In one embodiment of the present disclosure, the decryption process is the reverse process of the process of encrypting by using the preset encryption algorithm in the calling terminal. That is, after decrypting the first encrypted voice signals finally, the voice signals before encryption in the calling terminal is obtained.

Optionally, in one embodiment of the present disclosure, the receiving unit 830 further configured to receive second encrypted voice signals and a second random number for encryption and decryption sent by the calling terminal in a process of performing data communication with the calling terminal for the called terminal;

The second generating unit 840 further configured to generate a second decryption key by using a preset key generation algorithm according to the calling terminal IMSI, the called terminal IMSI, and the second random number for encryption and decryption;

The decryption unit 850 further configured to decrypt the second encrypted voice signals by using a preset encryption algorithm according to the second decryption key.

The second random number for encryption and decryption refers to an random number for encryption and decryption received by the called terminal from the calling terminal at a second moment. The second random number for encryption and decryption is different from the first random number for encryption and decryption, and the second random number for encryption and decryption corresponds to the second encrypted and decrypted voice signal received by the called terminal. Thus after the called terminal receives new second random number for encryption and decryption sent by the calling terminal at the second moment, the second decryption key is regenerated by using the second random number for encryption and decryption, and then the second encrypted voice signals is decrypted by using a preset encryption algorithm.

Different random numbers for encryption and decryption from the calling terminal is received at different times, different decryption keys is generated by using the currently received random numbers for encryption and decryption, a matrix displacement algorithm is used to decrypt the currently received corresponding voice signals. Therefore, since the decryption key is changed continuously during decryption processes of the voice communication, the matrix displacement mode is changed, encryption security is improved.

The functions of the function modules of the called terminal 800 in this embodiment may be specifically implemented according to the method in above method embodiments, and a specific implementation process may refer to related descriptions of above method embodiments and details are not described here again.

In one embodiment of the present disclosure, the called terminal 800 establishes a data communication connection between the called terminal 800 and the calling terminal, and obtains the calling terminal IMSI, the called terminal IMSI, and receives a first random number for encryption and decryption and first encrypted voice signals sent by the calling terminal. Then the called terminal 800 generates a first decryption key by using a preset key generation algorithm according to the calling terminal IMSI, the called terminal IMSI, and the first random number for encryption and decryption, and finally decrypts the first encrypted voice signals by using a preset encryption algorithm according to the first decryption key. The first decryption key is generated according to the calling terminal IMSI, the called terminal IMSI, and the first random number for encryption and decryption, and the voice signals are decrypted by using the preset encryption algorithm, thus a decryption process is highly targeted and highly confidential, and security of voice services is improved.

Moreover, since the IMS network-based voice communication uses an IP network for communication, communication cost can be saved.

Figure 9:
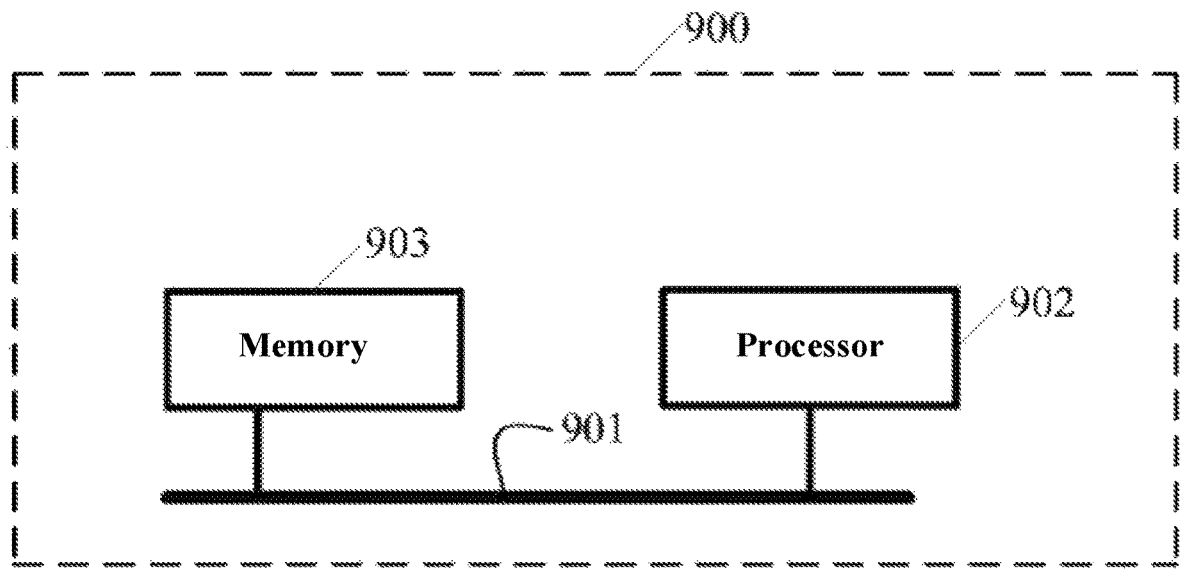
FIG. 9 shows a schematic structural diagram of a second embodiment of a called terminal according to the present disclosure.

FIG. 9 shows a schematic structural diagram of a second embodiment of a called terminal according to an embodiment of the present disclosure. As shown in FIG. 9, the called terminal 900 can include: at least one bus 901, and at least one processor 902 connected to the bus, and at least one memory 903 connected to the bus.

The processor 902 calls the code stored in the memory 903 through the bus 901 for establishing, by a called terminal, a data communication connection between a calling terminal and the called terminal; obtaining a calling terminal IMSI, a called terminal IMSI, and receiving a first random number for encryption and decryption sent by the calling terminal; receiving first encrypted voice signals sent by the calling terminal; generating a first decryption key by using a preset key generation algorithm according to the calling terminal IMSI, the called terminal IMSI, and the first random number for encryption and decryption; decrypting the first encrypted voice signals by using a preset encryption algorithm according to the first decryption key.

Optionally, in one embodiment of the present disclosure, the processor 902 further configured to:

Receiving, by the called terminal, second encrypted voice signals and a second random number for encryption and decryption sent by the calling terminal in a process of performing data communication with the calling terminal.

Generating a second decryption key by using a preset key generation algorithm according to the calling terminal IMSI, the called terminal IMSI, and the second random number for encryption and decryption;

Decrypting the second encrypted voice signals by using a preset encryption algorithm according to the second decryption key.

The functions of the function units of the called terminal 900 in this embodiment may be specifically implemented according to the method in above method embodiments, and a specific implementation process may refer to related descriptions of above method embodiments and details are not described here again.

In one embodiment of the present disclosure, the called terminal 900 establishes a data communication connection between the called terminal 900 and the calling terminal, and obtains the calling terminal IMSI, the called terminal IMSI, and receives a first random number for encryption and decryption and first encrypted voice signals sent by the calling terminal, then the called terminal 900 generates a first decryption key by using a preset key generation algorithm according to the calling terminal IMSI, the called terminal IMSI, and the first random number for encryption and decryption, and finally decrypts the first encrypted voice signals by using a preset encryption algorithm according to the first decryption key. The first decryption key is generated according to the calling terminal IMSI, the called terminal IMSI, and the first random number for encryption and decryption, and the voice signals are decrypted by using the preset encryption algorithm, thus a decryption process is highly targeted and highly confidential, and security of voice services is improved.

Moreover, since the IMS network-based voice communication uses an IP network for communication, communication cost can be saved.

Figure 10:
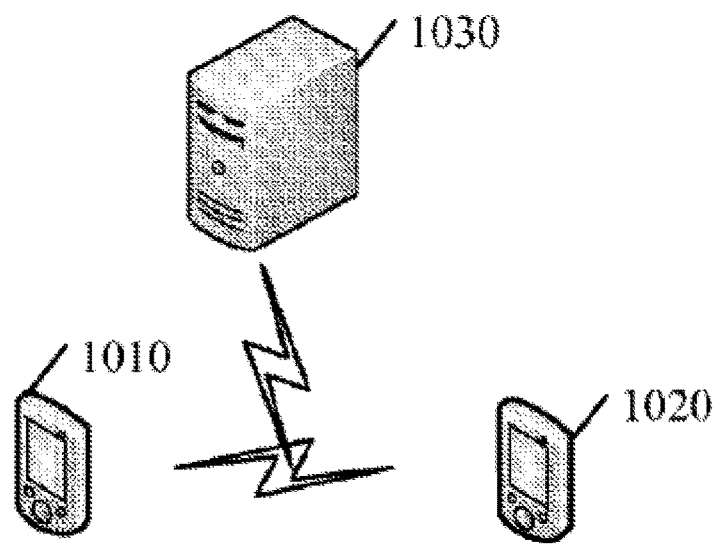
FIG. 10 shows a schematic diagram of a voice communication system according to the present disclosure.

FIG. 10 shows a schematic diagram of a voice communication system according to an embodiment of the present disclosure. As shown in FIG. 10, a voice communication system 1000 according to an embodiment of the present disclosure can include:

A calling terminal 1010 and a called terminal 1020;

The calling terminal 1010 configured to establish a data communication connection between the called terminal 1020 and the calling terminal 1010.

The calling terminal 1010 further configured to obtain a calling terminal international mobile subscriber identity (IMSI), a called terminal IMSI, and a first random number for encryption and decryption, and send the first random number for encryption and decryption to the called terminal 1020;

The calling terminal 1010 further configured to generate a first encryption key by using a preset key generation algorithm according to the calling terminal IMSI, the called terminal IMSI, and the first random number for encryption and decryption;

The calling terminal 1010 further configured to encrypt voice signals according to the first encryption key by using a preset encryption algorithm and obtaining first encrypted voice signals;

The calling terminal 1010 further configured to send the first encrypted voice signals to the called terminal 1020.

Optionally, in one embodiment of the present disclosure, the calling terminal 1010 further configured to obtain a second random number for encryption and decryption after a preset time interval in a process of performing data communication with the called terminal;

Optionally, in one embodiment of the present disclosure, the calling terminal 1010 further configured to generate a second decryption key by using a preset key generation algorithm according to the calling terminal IMSI, the called terminal IMSI, and the second random number for encryption and decryption;

Optionally, in one embodiment of the present disclosure, the calling terminal 1010 further configured to encrypt voice signals according to the second encryption key by using a preset encryption algorithm and obtain second encrypted voice signals.

Optionally, in one embodiment of the present disclosure, the calling terminal 1010 further configured to send the second encrypted voice signals to the called terminal 1020.

Optionally, in one embodiment of the present disclosure, the preset key generation algorithm can be an algorithm for encrypting global mobile communication system cellular communication.

The called terminal 1020 configured to establish a data communication connection between the calling terminal 1010 and the called terminal 1020;

The called terminal 1020 further configured to obtain a calling terminal IMSI, a called terminal IMSI, and receive a first random number for encryption and decryption sent by the calling terminal;

The called terminal 1020 further configured to receive first encrypted voice signals sent by the calling terminal 1010;

The called terminal 1020 further configured to generate a first decryption key by using a preset key generation algorithm according to the calling terminal IMSI, the called terminal IMSI, and the first random number for encryption and decryption;

The called terminal 1020 further configured to decrypt the first encrypted voice signals by using a preset encryption algorithm according to the first decryption key.

Optionally, in one embodiment of the present disclosure, the called terminal 1020 further configured to receive second encrypted voice signals and a second random number for encryption and decryption sent by the calling terminal in a process of performing data communication with the calling terminal;

Optionally, in one embodiment of the present disclosure, the called terminal 1020 further configured to generate a second decryption key by using a preset key generation algorithm according to the calling terminal IMSI, the called terminal IMSI, and the second random number for encryption and decryption;

Optionally, in one embodiment of the present disclosure, the called terminal 1020 further configured to decrypt the second encrypted voice signals by using a preset encryption algorithm according to the second decryption key.

Optionally, in one embodiment of the present disclosure, the voice communication system 1000 further includes:

The listening terminal 1030, which is configured to obtain the calling terminal IMSI, the called terminal IMSI, an random number for encryption and decryption and encrypted voice signals through multimedia subsystem network node.

The listening terminal 1030 further configured to generate a decryption key by using a preset key generation algorithm according to the calling terminal IMSI, the called terminal IMSI, and the random number for encryption and decryption.

The listening terminal 1030 further configured to decrypt the encrypted voice signals by using a preset encryption algorithm according to the first decryption key.

In one embodiment of the present disclosure, the voice communication system 1000 establishes the data communication connection between the called terminal 1020 and the calling terminal 1010, and the calling terminal 1010 obtains the calling terminal IMSI, the called terminal IMSI, and the first random number for encryption and decryption, and sends the first random number for encryption and decryption to the called terminal 1020. And then the calling terminal 1010 generates a first encryption key using a preset key generation algorithm according to the calling terminal IMSI, the called terminal IMSI, and the first random number for encryption and decryption, and encrypts voice signals by using a preset encryption algorithm according to the first encryption key, and obtaining first encrypted voice signals, and finally sends the first encrypted voice signals to the called terminal 1020. The called terminal 1020 establishes the data communication connection between the calling terminal 1010 and the called terminal 1020, obtains the calling terminal IMSI, the called terminal IMSI, and receives a first random number for encryption and decryption and the first encrypted voice signals sent by the calling terminal 1010, then the called terminal 1020 generates a first decryption key by using a preset key generation algorithm according to the calling terminal IMSI, the called terminal IMSI, and the first random number for encryption and decryption, finally decrypts the first encrypted voice signals by using a preset encryption algorithm according to the first decryption key. The first decryption key is generated according to the calling terminal IMSI, the called terminal IMSI, and the first random number for encryption and decryption, and the voice signals are decrypted by using the preset encryption algorithm, thus a decryption process is highly targeted and highly confidential, and security of voice services is improved.

Moreover, since the IMS network-based voice communication uses an IP network for communication, communication cost can be saved.

The functions of the function units of the voice communication system 1000 in this embodiment may be specifically implemented according to the method in above method embodiments, and a specific implementation process may refer to related descriptions of above method embodiments and details are not described here again.

In one embodiment of the present disclosure, the communication terminal 400 establishes a network connection with the anti-theft associated device by starting the anti-theft communication card solidified in the communication terminal under the trigger of the preset anti-theft time, the communication terminal 400 then communicates with the anti-theft association setting based on the network connection and finally transmits the positioning information to the anti-theft associated device. Therefore, after the communication terminal is stolen, the data connection between the communication terminal and the background can be realized based on the non-removable anti-theft communication card in the communication terminal, which is convenient for an owner locate a mobile phone.

The embodiment of the present disclosure further provides a computer storage medium, and the computer storage medium store a program that performs all or part of the steps including any of the speech concentric squares described in the above embodiments.

It should be noted that, for a simple description, the above method embodiments expressed as a series of action combinations, but those skilled in the art should understand that the present disclosure is not limited by the described action sequence. According to the present disclosure, some steps in the above embodiments can be performed in other sequences or simultaneously. Secondly, those skilled in the art should also understand that the embodiments described in the specification are all optional embodiments, and the actions and units involved are not necessarily required by the present disclosure.

In the above embodiments, descriptions of each embodiment has different focuses, and when there is no detail part in a certain embodiment, please refer to relevant parts of other embodiments.

In several embodiments provided in the preset application, it should be understood that the disclosed apparatus can be implemented in other ways. For example, the device embodiments described above are merely illustrative. For example, divisions of the unit are only a logical function division, and there can be other division ways in actual implementation. For example, multiple units or components can be combined or can be integrated into another system, or some features can be ignored or not executed. In addition, a mutual coupling or a direct coupling or communication connection shown or discussed can be an indirect coupling or communication connection through some interfaces, devices or units, and can be electrical or other forms.

The units described as separate components may or may not be physically separated, and the components displayed as units may or may not be physical units. That is, it can locate in one place, or distribute to multiple network units. Some or all of the units can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

When an integrated unit implemented in the form of a software functional unit and sold or used as a standalone product, it can be stored in a computer readable storage medium. Based on this, the technical solutions of the present disclosure, or parts that contribute to an existing technology, or all or part of the technical solution can be embodied in a form of a software product. The computer software product stored in a storage medium, and the computer software product includes instructions for a computer device to perform all or part of the steps of the method described in various embodiments of the present disclosure.

The above embodiments are only used to illustrate technical solutions of the present disclosure, rather than restrictions on the technical solutions. Although the present disclosure has been described in detail with reference to the above embodiments, those skilled in the art should understand that the technical solutions described in one embodiments can be modified, or some of technical features can be equivalently substituted, and these modifications or substitutions do not detract from the essence of the corresponding technical solutions from the scope of the technical solutions of the embodiments of the present disclosure.

We claim:

1. A voice communication method, comprising:
establishing, by a calling terminal, a data communication connection between a called terminal and the calling terminal;
obtaining a calling terminal international mobile subscriber identity (IMSI), a called terminal IMSI, and a first random number for encryption and decryption, and sending the first random number for encryption and decryption to the called terminal;
generating a first encryption key by using a preset key generation algorithm according to the calling terminal IMSI, the called terminal IMSI, and the first random number for encryption and decryption;
encrypting voice signals according to the first encryption key by using a preset encryption algorithm and obtaining first encrypted voice signals, wherein the preset encryption algorithm is a matrix displacement encryption algorithm, a complexity of the matrix displacement encryption algorithm depending on a matrix row M, a matrix column N, and a column transformation sequence, values of the matrix row M, the matrix column N, and the column transformation sequence are determined by a key Kc that is changed periodically, the key Kc is generated according to a random number RAND, the key Kc corresponds to a combination of the matrix row M, the matrix column N, and the column transformation sequence, a correspondence table between the key Kc and the matrix row M, the matrix column N, and the column transformation sequence is stored in the calling terminal, the voice signals are converted into a pulse code modulation (PCM) digital code stream and the PCM digital code stream is matrix transform encrypted according to the correspondence table by using the key Kc;
sending the first encrypted voice signals to the called terminal.

2. The method of claim 1, further comprising:
obtaining, by the calling terminal, a second random number for encryption and decryption after a preset time interval in a process of performing data communication with the called terminal;
generating a second decryption key by using the preset key generation algorithm according to the calling terminal IMSI, the called terminal IMSI, and the second random number for encryption and decryption;
encrypting voice signals according to the second encryption key by using the preset encryption algorithm and obtaining second encrypted voice signals;
sending the second encrypted voice signals to the called terminal.

3. A voice communication method, comprising:
establishing, by a called terminal, a data communication connection between a calling terminal and the called terminal;
obtaining a calling terminal IMSI, a called terminal IMSI, and receiving a first random number for encryption and decryption sent by the calling terminal;
receiving first encrypted voice signals sent by the calling terminal;
generating a first decryption key by using a preset key generation algorithm according to the calling terminal IMSI, the called terminal IMSI, and the first random number for encryption and decryption, wherein the preset encryption algorithm is a matrix displacement encryption algorithm, a complexity of the matrix displacement encryption algorithm depending on a matrix row M, a matrix column N, and a column transformation sequence, values of the matrix row M, the matrix column N, and the column transformation sequence are determined by a key Kc that is changed periodically, the key Kc is generated according to a random number RAND, the key Kc corresponds to a combination of the matrix row M, the matrix column N, and the column transformation sequence, a correspondence table between the key Kc and the matrix row M, the matrix column N, and the column transformation sequence is stored in the calling terminal, the voice signals are converted into a pulse code modulation (PCM) digital code stream and the PCM digital code stream is matrix transform encrypted according to the correspondence table by using the key Kc;

decrypting the first encrypted voice signals by using a preset encryption algorithm according to the first decryption key.

4. The method of claim 3, further comprising:

receiving, by the called terminal, second encrypted voice signals and a second random number for encryption and decryption sent by the calling terminal in a process of performing data communication with the calling terminal;

generating a second decryption key by using the preset key generation algorithm according to the calling terminal IMSI, the called terminal IMSI, and the second random number for encryption and decryption;

decrypting the second encrypted voice signals by using the preset encryption algorithm according to the second decryption key.

5. A calling terminal, comprising:

at least one processor; and a storage device storing a plurality of instructions, which when executed by the processor, causes the at least one processor to:

establish a data communication connection between a called terminal and the calling terminal for the calling terminal;

obtain a calling terminal international mobile subscriber identity (IMSI), a called terminal IMSI, and a first random number for encryption and decryption, and send the first random number for encryption and decryption to the called terminal;

generate a first encryption key by using a preset key generation algorithm according to the calling terminal IMSI, the called terminal IMSI, and the first random number for encryption and decryption;

encrypt voice signals according to the first encryption key by using a preset encryption algorithm and obtain first encrypted voice signals, wherein the preset encryption algorithm is a matrix displacement encryption algorithm, a complexity of the matrix displacement encryption algorithm depending on a matrix row M, a matrix column N, and a column transformation sequence, values of the matrix row M, the matrix column N, and the column transformation sequence are determined by a key Kc that is changed periodically, the key Kc is generated according to a random number RAND, the key Kc corresponds to a combination of the matrix row M, the matrix column N, and the column transformation sequence, a correspondence table between the key Kc and the matrix row M, the matrix column N, and the column transformation sequence is stored in the calling terminal, the voice signals are converted into a pulse code modulation (PCM) digital code stream and the PCM digital code stream is matrix transform encrypted according to the correspondence table by using the key Kc;

send the first encrypted voice signals to the called terminal.

6. The calling terminal of claim 5, wherein the at least one processor obtains a second random number for encryption and decryption after a preset time interval in a process of performing data communication with the called terminal for the calling terminal;

generates a second decryption key by using the preset key generation algorithm according to the calling terminal IMSI, the called terminal IMSI, and the second random number for encryption and decryption;

encrypts voice signals according to the second encryption key by using the preset encryption algorithm and obtains second encrypted voice signals;

sends the second encrypted voice signals to the called terminal.

* * * * *